(12) United States Patent
Swanson et al.

(10) Patent No.: US 11,741,664 B1
(45) Date of Patent: Aug. 29, 2023

(54) RESITUATING VIRTUAL CAMERAS AND AVATARS IN A VIRTUAL ENVIRONMENT

(71) Applicant: Katmai Tech Inc., New York, NY (US)

(72) Inventors: Kristofor Bernard Swanson, Anchorage, AK (US); Gerard Cornelis Krol, Leiden (NL); Erik Braund, Saugerties, NY (US)

(73) Assignee: Katmai Tech Inc., New York, NY (US)

( * ) Notice: Subject to any disclaimer, the term of this patent is extended or adjusted under 35 U.S.C. 154(b) by 0 days.

(21) Appl. No.: 17/870,101

(22) Filed: Jul. 21, 2022

(51) Int. Cl.
*G06T 15/20* (2011.01)
*G06T 15/04* (2011.01)
*G06T 13/40* (2011.01)

(52) U.S. Cl.
CPC ............ *G06T 15/20* (2013.01); *G06T 13/40* (2013.01); *G06T 15/04* (2013.01); *G06T 2210/21* (2013.01)

(58) Field of Classification Search
CPC ......... G06T 15/04; G06T 15/20; G06T 13/40; G06T 2210/21
See application file for complete search history.

(56) References Cited

U.S. PATENT DOCUMENTS

| 6,215,498 B1 | 4/2001 | Filo et al. |
| 6,559,863 B1 | 5/2003 | Megiddo |
| 6,583,808 B2 | 6/2003 | Boulanger et al. |
| 6,772,195 B1 * | 8/2004 | Hatlelid ............... G06F 3/04815 709/224 |
| 6,853,398 B2 | 2/2005 | Malzbender et al. |
| 7,197,126 B2 | 3/2007 | Kanada |
| 7,346,654 B1 | 3/2008 | Weiss |

(Continued)

FOREIGN PATENT DOCUMENTS

| CN | 103580881 A | 2/2014 |
| CN | 105487657 A | 4/2016 |

(Continued)

OTHER PUBLICATIONS

Dipaola, S. and Collins, D., "A 3D Virtual Environment for Social Telepresence", Mar. 2002; 6 pages.

(Continued)

*Primary Examiner* — Daniel F Hajnik
(74) *Attorney, Agent, or Firm* — Sterne, Kessler, Goldstein & Fox P.L.L.C.

(57) ABSTRACT

Disclosed herein are aspects for resituating virtual cameras and avatars in a virtual environment. An aspect begins by rendering the virtual environment, including a first avatar and a second avatar. The virtual environment is rendered on a first device, belonging to a first user, and from a perspective of a first virtual camera controlled by the first user. The first avatar represents the first user at a location of the first virtual camera. The second user views the virtual environment from a perspective of a second virtual camera at a location of the second avatar. The aspect proceeds by repositioning the first virtual camera and the first avatar to a first location and resituating the second avatar to a second location. The aspect concludes by sending a message instructing a second device, belonging to the second user, to resituate the second virtual camera to the second location.

20 Claims, 16 Drawing Sheets

(56) References Cited

U.S. PATENT DOCUMENTS

| | | | |
|---|---|---|---|
| 7,386,799 B1 * | 6/2008 | Clanton | A63F 13/12 |
| | | | 715/861 |
| 7,634,073 B2 | 12/2009 | Kanada | |
| 7,840,668 B1 | 11/2010 | Sylvain et al. | |
| 8,072,479 B2 | 12/2011 | Valliath et al. | |
| 8,279,254 B2 | 10/2012 | Goose et al. | |
| 8,403,751 B2 | 3/2013 | Boustead et al. | |
| 8,520,872 B2 | 8/2013 | Jang et al. | |
| 8,620,009 B2 | 12/2013 | Zhang et al. | |
| 9,041,764 B2 | 5/2015 | Wang et al. | |
| 9,218,685 B2 | 12/2015 | Piemonte et al. | |
| 9,305,319 B2 | 4/2016 | Maor et al. | |
| 9,384,594 B2 | 7/2016 | Maciocci et al. | |
| 9,420,229 B2 | 8/2016 | Pourashraf et al. | |
| 9,565,316 B2 | 2/2017 | Gleim | |
| 9,607,428 B2 | 3/2017 | Li | |
| 9,656,168 B1 | 5/2017 | Bear et al. | |
| 9,661,274 B2 | 5/2017 | Kubota et al. | |
| 9,743,044 B2 | 8/2017 | Safaei et al. | |
| 9,910,509 B2 | 3/2018 | Markovic et al. | |
| 10,013,805 B2 | 7/2018 | Barzuza et al. | |
| 10,155,164 B2 | 12/2018 | Boustead et al. | |
| 10,304,238 B2 | 5/2019 | Cooper et al. | |
| 10,304,239 B2 | 5/2019 | Gorur Sheshagiri et al. | |
| 10,334,384 B2 | 6/2019 | Sun et al. | |
| 10,356,216 B2 | 7/2019 | Khalid et al. | |
| 10,573,071 B2 | 2/2020 | Sun et al. | |
| 10,609,334 B2 | 3/2020 | Li | |
| 10,678,323 B2 * | 6/2020 | Gibson | G06T 15/20 |
| 10,679,411 B2 | 6/2020 | Ziman | |
| 10,979,672 B1 | 4/2021 | Krol et al. | |
| 11,057,351 B1 | 7/2021 | Simanel et al. | |
| 2002/0158873 A1 | 10/2002 | Williamson | |
| 2007/0274528 A1 | 11/2007 | Nakamoto et al. | |
| 2009/0113314 A1 | 4/2009 | Dawson et al. | |
| 2011/0072367 A1 | 3/2011 | Bauer | |
| 2013/0321564 A1 | 12/2013 | Smith et al. | |
| 2014/0058807 A1 | 2/2014 | Altberg et al. | |
| 2015/0302661 A1 | 10/2015 | Miller | |
| 2017/0351476 A1 | 12/2017 | Yoakum | |
| 2019/0130599 A1 * | 5/2019 | Gebbie | G06V 40/23 |
| 2019/0199993 A1 | 6/2019 | Babu et al. | |
| 2019/0310761 A1 | 10/2019 | Agarawala et al. | |
| 2019/0320144 A1 | 10/2019 | Tong et al. | |
| 2019/0354170 A1 | 11/2019 | Rosedale | |
| 2019/0371060 A1 | 12/2019 | Energin et al. | |
| 2020/0008003 A1 | 1/2020 | Thompson et al. | |
| 2020/0037091 A1 | 1/2020 | Jeon et al. | |
| 2020/0098191 A1 | 3/2020 | McCall | |
| 2020/0221247 A1 | 7/2020 | Latypov et al. | |
| 2022/0156998 A1 * | 5/2022 | Lee | G06T 15/205 |

FOREIGN PATENT DOCUMENTS

| | | |
|---|---|---|
| CN | 103888714 B | 4/2017 |
| CN | 106648528 A | 5/2017 |
| CN | 108319439 A | 7/2018 |
| CN | 106528038 B | 9/2019 |
| EP | 3282669 B1 | 1/2020 |
| EP | 3627860 A1 | 3/2020 |
| EP | 3684083 A1 | 7/2020 |
| GB | 2351216 B | 12/2002 |
| JP | H07288791 A | 10/1995 |
| JP | 2003006132 A | 1/2003 |
| JP | 4426484 B2 | 3/2010 |
| KR | 20200028871 A | 3/2020 |
| WO | WO 2008125593 A2 | 10/2008 |
| WO | WO 2008141596 A1 | 11/2008 |
| WO | WO 2010083119 A2 | 7/2010 |
| WO | WO 2010143359 A1 | 12/2010 |
| WO | WO 2018005235 A1 | 1/2018 |
| WO | WO 2019008320 A1 | 1/2019 |
| WO | WO 2019046597 A1 | 3/2019 |
| WO | WO 2020041652 A1 | 2/2020 |

OTHER PUBLICATIONS

EngageVR, "Next Generation Education, Training, Meetings & Events," accessed at https://engagevr.io/. accessed on Oct. 28, 2020; 6 pages.

Event Farm, "Bring Your Events Into the Virtual World," accessed at https://eventfarm.com/the-echo. accessed on Oct. 28, 2020; 6 pages.

Hongtongsak, K., "Accurately Pinpointing 3D Sound in Virtual Environments," Jun. 2016, 31 pages.

Johansson, N., "The 10 Best VR Meeting Apps—Productive Remote Collaboration," accessed at https://immersive.ly/best-vr-apps-productive-remote-meetings/. accessed on Oct. 28, 2020; 10 pages.

Leung, W. and Chen, T., "Networked Collaborative Environment With Animated 3D Avatars, Dept. of Electrical and Computer Engineering Carnegie Mellon University," Aug. 6, 2002; 3 pages.

Leung, W et al.., "Networked Intelligent Collaborative Environment (NetICE), Multimedia and Expo 2000," Aug. 6, 2002; 4 pages.

Leung, W. and Chen, T., "A Multi-User 3-D Virtual Environment With Interactive Collaboration and Shared Whiteboard Technologies, Kluwer Academic Publishers," Jul. 23, 2003, 17 pages.

Lin, J. et al., "A Virtual Reality Platform for Dynamic Human-Scene Interaction," Dec. 2016; 4 pages.

Nishihara, R. and Okubo, M., "A Study on Personal Space in Virtual Space Based on Personality," 2015; 8 pages.

Sandre, A., "Is Virtual Reality the Future of Video Conferencing?" May 15, 2020; 7 pages.

De Sousa, A., "Remote Proxemics for Collaborative Virtual Environments," Nov. 2014; 10 pages.

Takahashi, D., "MeetinVR launches online VR meetings with 'superpowers'," venturebeat.com, accessed at https://venturebeat.com/2020/05/27/meetinvr-launches-online-vr-meetings-with-superpowers, published May 27, 2020; 7 pages.

Teooh, "Virtual Spaces for Real Communities," accessed at https://teooh.com/, accessed on Oct. 28, 2020; 3 pages.

VirBELA Media, "Team Suites," accessed at https://www.virbela.com/teamsuites, accessed on Oct. 1, 2020; 26 pages.

Virtway Events, "Your 3D Space for Events," accessed at https://www.virtwayevents.com/, accessed on Oct. 28, 2020; 5 pages.

SaganWorks product website, "A personal metaverse of knowledge: Create stunning spaces to organize and store your information," available at https://saganworks.com, accessed Aug. 4, 2022; 4 pages.

Spatial, "Frequently Asked Questions," product website available at https://support.spatial.io/hc/en-us, accessed Aug. 4, 2022; 3 pages.

VSpatial product website, Virtual Reality Offices, "The workspace of the Future is Here." available at https://vspatial.com, accessed Aug. 4, 2022; 5 pages.

LearnOpenGL—CSM Online Resource, "Cascaded Shadow Mapping," available at https://learnopengl.com/Guest-Articles/2021/CSM, accessed Aug. 2, 2022; 10 pages.

Wikipedia, online resource, "Shadow mapping," available at https://en.wikipedia.org/wiki/Shadow_mapping, accessed Aug. 2, 2022; 6 pages.

Wikipedia, online resource, "Volumetric lighting," available at https://en.wikipedia.org/wiki/Volumetric_lighting, accessed Aug. 2, 2022; 2 pages.

\* cited by examiner

1002 — Rendering, on a first device of a first user and from a perspective of a first virtual camera controlled by the first user, a 3D virtual environment, including a first avatar and a second avatar, wherein the first avatar represents the first user at a location of the first virtual camera and the second avatar represents a second user, wherein the second user views the 3D virtual environment from a perspective of a second virtual camera at a location of the second avatar

1004 — From the perspective of the first virtual camera

1004-1 — Determining a new location for a perceived avatar relative to the first avatar, wherein the perceived avatar corresponds to the second avatar

1004-2 — Resituating the perceived avatar to the new location, wherein the second avatar and the second virtual camera are maintained for the second user

FIG. 10

RESITUATING VIRTUAL CAMERAS AND AVATARS IN A VIRTUAL ENVIRONMENT

BACKGROUND

Technical Field

Aspects of the present disclosure relate to components, systems, and methods for resituating entities in a virtual environment.

Related Art

Video conferencing involves the reception and transmission of audio-video signals by users at different locations for communication between people in real time. Videoconferencing is widely available on many computing devices from a variety of different services, including the ZOOM service available from Zoom Communications Inc. of San Jose, Calif. Some videoconferencing software, such as the FaceTime application available from Apple Inc. of Cupertino, Calif., comes standard with mobile devices.

In general, these applications operate by displaying video and outputting audio of other conference participants. When there are multiple participants, the screen may be divided into a number of rectangular frames, each displaying video of a participant. Sometimes these services operate by having a larger frame that presents video of the person speaking. As different individuals speak, that frame will switch between speakers. The application captures video from a camera integrated with the user's device and audio from a microphone integrated with the user's device. The application then transmits that audio and video to other applications running on other user devices.

Many of these videoconferencing applications have a screen share functionality. When a user decides to share their screen (or a portion of their screen), a stream is transmitted to the other users' devices with the contents of their screen. In some cases, other users can even control what is on the user's screen. In this way, users can collaborate on a project or make a presentation to the other meeting participants.

Recently, videoconferencing technology has gained importance. Especially since the COVID-19 pandemic, many workplaces, trade shows, meetings, conferences, schools, and places of worship are now taking place at least partially online. Virtual conferences using videoconferencing technology are increasingly replacing physical conferences. In addition, this technology provides advantages over physically meeting to avoid travel and commuting.

However, often, use of this videoconferencing technology causes loss of a sense of place. There is an experiential aspect to meeting in person physically, being in the same place, that is lost when conferences are conducted virtually. There is a social aspect to being able to posture yourself and look at your peers. This feeling of experience is important in creating relationships and social connections. Yet, this feeling is lacking when it comes to conventional videoconferences.

Moreover, when the conference starts to get several participants, additional problems occur with these videoconferencing technologies. Where with physical meeting conferences people are able to gather in an area or a conference room to effectively interact with one another, virtual conferences often limit the ability to see or hear all participants. Even when all participants can be seen or heard in the virtual world, there may be a problem finding natural spacing or ordering amongst the participants.

Further in physical meeting conferences, people can have side interactions. You can project your voice so that only people close to you can hear what you're saying. In some cases, you can even have private conversations in the context of a larger meeting. However, with virtual conferences, when multiple people are speaking at the same time, the software mixes the two audio streams substantially equally, causing the participants to speak over one another. Thus, when multiple people are involved in a virtual conference, private conversations are impossible, and the dialogue tends to be more in the form of speeches from one to many. Here, too, virtual conferences lose an opportunity for participants to create social connections and to communicate and network more effectively.

Massively multiplayer online games (MMOG or MMO) generally can handle quite a few more than 25 participants. These games often have hundreds or thousands of players on a single server. MMOs often allow players to navigate avatars around a virtual world. Sometimes these MMOs allow users to speak with one another or send messages to one another. Examples include the ROBLOX game available from Roblox Corporation of San Mateo, Calif., and the MINECRAFT game available from Mojang Studios of Stockholm, Sweden.

Having bare avatars interact with one another also has limitations in terms of social interaction. These avatars usually cannot communicate facial expressions, which people often make inadvertently. These facial expressions are observable in videoconferences. Some publications may describe having video placed on an avatar in a virtual world. However, these systems typically require specialized software and have other limitations that limit their usefulness.

Improved methods are needed for videoconferencing.

SUMMARY

In an aspect, a computer-implemented method provides for resituating virtual cameras and avatars in a three-dimensional (3D) virtual environment. The method begins by rendering the 3D virtual environment, including a first avatar and a second avatar. The 3D virtual environment is rendered on a first device, belonging to a first user, and from a perspective of a first virtual camera controlled by the first user. The first avatar in the 3D virtual environment represents the first user at a location of the first virtual camera. Likewise, the second avatar in the 3D virtual environment represents a second user. The second user views the 3D virtual environment from a perspective of a second virtual camera at a location of the second avatar. The method continues by selecting a first location and a second location around a point in the 3D virtual environment. The method proceeds by repositioning the first virtual camera and the first avatar to the first location. The first virtual camera and the first avatar are oriented to face the point in the 3D virtual environment. Next, the method continues by resituating the second avatar to the second location. The second avatar is oriented to face the point in the 3D virtual environment. The method concludes by sending a message instructing a second device, belonging to the second user, to resituate the second virtual camera to the second location and to orient the second virtual camera to face the point in the 3D virtual environment.

System, device, and computer program product aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

FIG. 10 is a flowchart illustrating a method for resituating avatars in a virtual environment, without resituating corresponding virtual cameras.

In the drawings, like reference numbers generally indicate identical or similar elements. Additionally, generally, the left-most digit(s) of a reference number identifies the drawing in which the reference number first appears.

Aspects of the present disclosure will be described with reference to the accompanying drawings.

DETAILED DESCRIPTION

Video Conference with Avatars in a Virtual Environment

Figure 1:
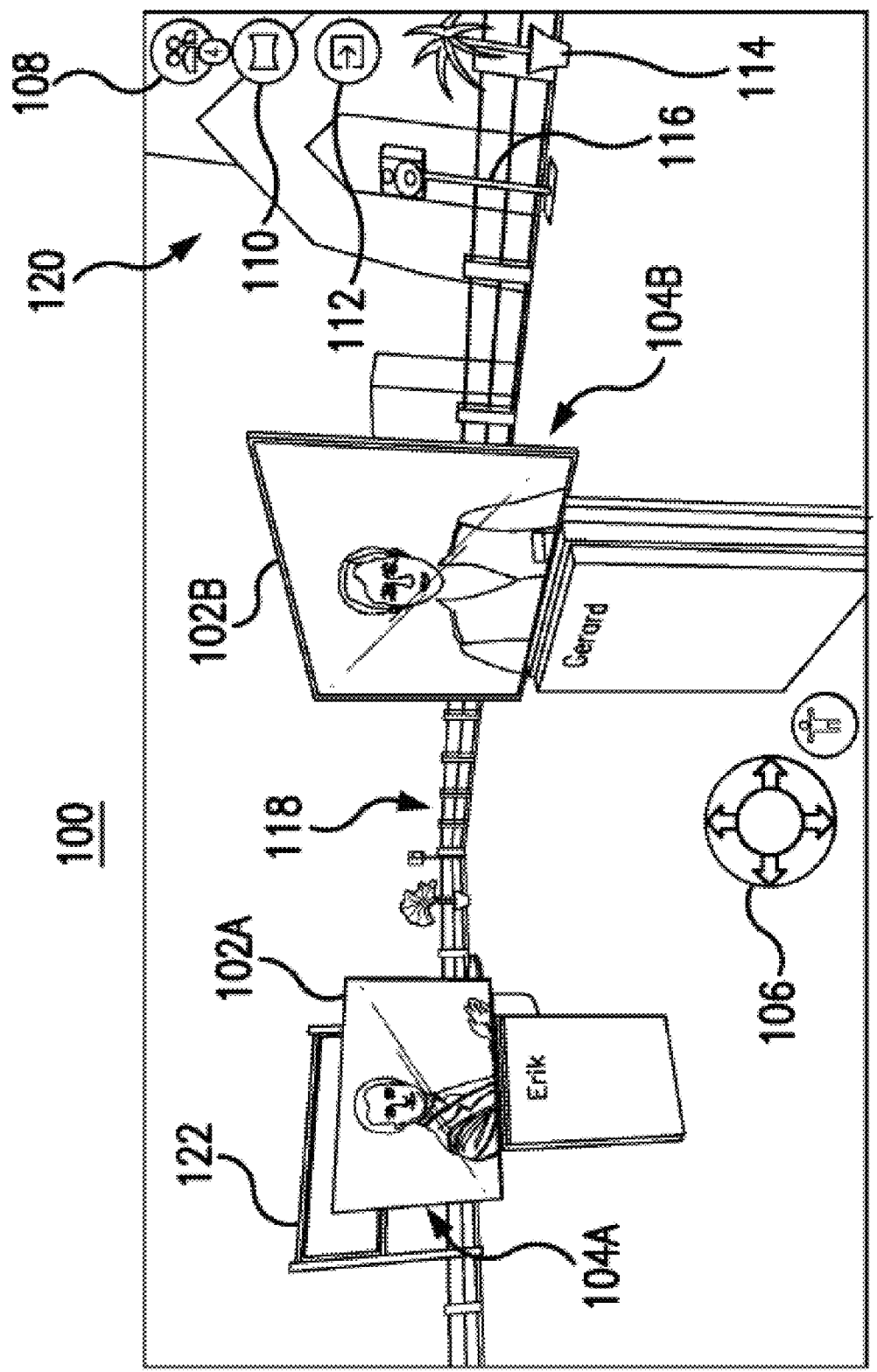
FIG. 1 is a diagram illustrating an example interface that provides videoconferencing in a virtual environment with video streams being mapped onto avatars.

FIG. 1 is a diagram illustrating an example of an interface 100 that provides videoconferences in a virtual environment with video streams being mapped onto avatars.

Interface 100 may be displayed to a participant to a videoconference. For example, interface 100 may be rendered for display to the participant and may be constantly updated as the videoconference progresses. A user may control the orientation of their virtual camera using, for example, keyboard inputs. In this way, the user can navigate around a virtual environment. In an aspect, different inputs may change the virtual camera's X and Y position and pan and tilt angles in the virtual environment. In further aspects, a user may use inputs to alter height (the Z coordinate) or yaw of the virtual camera. In still further aspects, a user may enter inputs to cause the virtual camera to "hop" up while returning to its original position, simulating gravity. The inputs available to navigate the virtual camera may include, for example, keyboard and mouse inputs, such as WASD keyboard keys to move the virtual camera forward, backward, left, or right on an X-Y plane, a space bar key to "hop" the virtual camera, and mouse movements specifying changes in pan and tilt angles.

Interface 100 includes avatars 102A and B, which each represent different participants to the videoconference. Avatars 102A and B, respectively, have texture mapped video streams 104A and B from devices of the first and second participant. A texture map is an image applied (mapped) to the surface of a shape or polygon. Here, the images are respective frames of the video. The camera devices capturing video streams 104A and B are positioned to capture faces of the respective participants. In this way, the avatars have texture mapped thereon, moving images of faces as participants in the meeting talk and listen.

Similar to how the virtual camera is controlled by the user viewing interface 100, the location and direction of avatars 102A and B are controlled by the respective participants that they represent. Avatars 102A and B are three-dimensional models represented by a mesh. Each avatar 102A and B may have the participant's name underneath the avatar.

The respective avatars 102A and B are controlled by the various users. They each may be positioned at a point corresponding to where their own virtual cameras are located within the virtual environment. Just as the user viewing interface 100 can move around the virtual camera, the various users can move around their respective avatars 102A and B.

The virtual environment rendered in interface 100 includes background image 120 and a three-dimensional model 118 of an arena. The arena may be a venue or building in which the videoconference should take place. The arena may include a floor area bounded by walls. Three-dimensional model 118 can include a mesh and texture. Other ways to mathematically represent the surface of three-dimensional model 118 may be possible as well. For example, polygon modeling, curve modeling, and digital sculpting may be possible. For example, three-dimensional model 118 may be represented by voxels, splines, geometric primitives, polygons, or any other possible representation in three-dimensional space. Three-dimensional model 118 may also include specification of light sources. The light sources can include for example, point, directional, spotlight, and ambient. The objects may also have certain properties describing how they reflect light. In examples, the properties may include diffuse, ambient, and spectral lighting interactions.

In addition to the arena, the virtual environment can include various other three-dimensional models that illustrate different components of the environment. For example, the three-dimensional environment can include a decorative model 114, a speaker model 116, and a presentation screen model 122. Just as with model 118, these models can be represented using any mathematical way to represent a geometric surface in three-dimensional space. These models may be separate from model 118 or combined into a single representation of the virtual environment.

Decorative models, such as model 114, serve to enhance the realism and increase the aesthetic appeal of the arena. Speaker model 116 may virtually emit sound, such as presentation and background music. Presentation screen model 122 can serve to provide an outlet to present a presentation. Video of the presenter or a presentation screen share may be texture mapped onto presentation screen model 122.

Button 108 may provide the user with a list of participants. In one example, after a user selects button 108, the user can chat with other participants by sending text messages, individually or as a group.

Button 110 may enable a user to change attributes of the virtual camera used to render interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60 and 110°, which is commensurate with a wide-angle lens and human vision. However, selecting button 110 may cause the virtual camera to increase the field of view to exceed 170°, commensurate with a fisheye lens. This may enable a user to have broader peripheral awareness of their surroundings in the virtual environment.

Finally, button 112 causes the user to exit the virtual environment. Selecting button 112 may cause a notification to be sent to devices belonging to the other participants signaling to their devices to stop displaying the avatar corresponding to the user previously viewing interface 100.

In this way, interface virtual 3D space is used to conduct video conferencing. Every user controls an avatar, which they can control to move around, look around, jump or do other things which change the position or orientation. A virtual camera shows the user the virtual 3D environment and the other avatars. The avatars of the other users have as an integral part a virtual display, which shows the webcam image of the user.

By giving users a sense of space and allowing users to see each other's faces, aspects provide a more social experience than conventional web conferencing or conventional MMO gaming. That more social experience has a variety of applications. For example, it can be used in online shopping. For example, interface 100 has applications in providing virtual grocery stores, houses of worship, trade shows, B2B sales, B2C sales, schooling, restaurants or lunchrooms, product releases, construction site visits (e.g., for architects, engineers, contractors), office spaces (e.g., people work "at their desks" virtually), controlling machinery remotely (ships, vehicles, planes, submarines, drones, drilling equipment, etc.), plant/factory control rooms, medical procedures, garden designs, virtual bus tours with guide, music events (e.g., concerts), lectures (e.g., TED talks), meetings of political parties, board meetings, underwater research, research on hard to reach places, training for emergencies (e.g., fire), cooking, shopping (with checkout and delivery), virtual arts and crafts (e.g., painting and pottery), marriages, funerals, baptisms, remote sports training, counseling, treating fears (e.g., confrontation therapy), fashion shows, amusement parks, home decoration, watching sports, watching esports, watching performances captured using a three-dimensional camera, playing board and role playing games, walking over/through medical imagery, viewing geological data, learning languages, meeting in a space for the visually impaired, meeting in a space for the hearing impaired, participation in events by people who normally can't walk or stand up, presenting the news or weather, talk shows, book signings, voting, MMOs, buying/selling virtual locations (such as those available in some MMOs like the SECOND LIFE game available from Linden Research, Inc. of San Francisco, Calif.), flea markets, garage sales, travel agencies, banks, archives, computer process management, fencing/sword fighting/martial arts, reenactments (e.g., reenacting a crime scene and or accident), rehearsing a real event (e.g., a wedding, presentation, show, space-walk), evaluating or viewing a real event captured with three-dimensional cameras, livestock shows, zoos, experiencing life as a tall/short/blind/deaf/white/black person (e.g., a modified video stream or still image for the virtual world to simulate the perspective when a user wishes to experience the reactions), job interviews, game shows, interactive fiction (e.g., murder mystery), virtual fishing, virtual sailing, psychological research, behavioral analysis, virtual sports (e.g., climbing/bouldering), controlling the lights etc. in your house or other location (domotics), memory palace, archaeology, gift shop, virtual visit so customers will be more comfortable on their real visit, virtual medical procedures to explain the procedures and have people feel more comfortable, and virtual trading floor/financial marketplace/stock market (e.g., integrating real-time data and video feeds into the virtual world, real-time transactions and analytics), virtual location people have to go to as part of their work so they will actually meet each other organically (e.g., if you want to create an invoice, it is only possible from within the virtual location) and augmented reality where you project the face of the person on top of their AR headset (or helmet) so you can see their facial expressions (e.g., useful for military, law enforcement, firefighters, and special ops), and making reservations (e.g., for a certain holiday, home/car/etc.)

Figure 2:
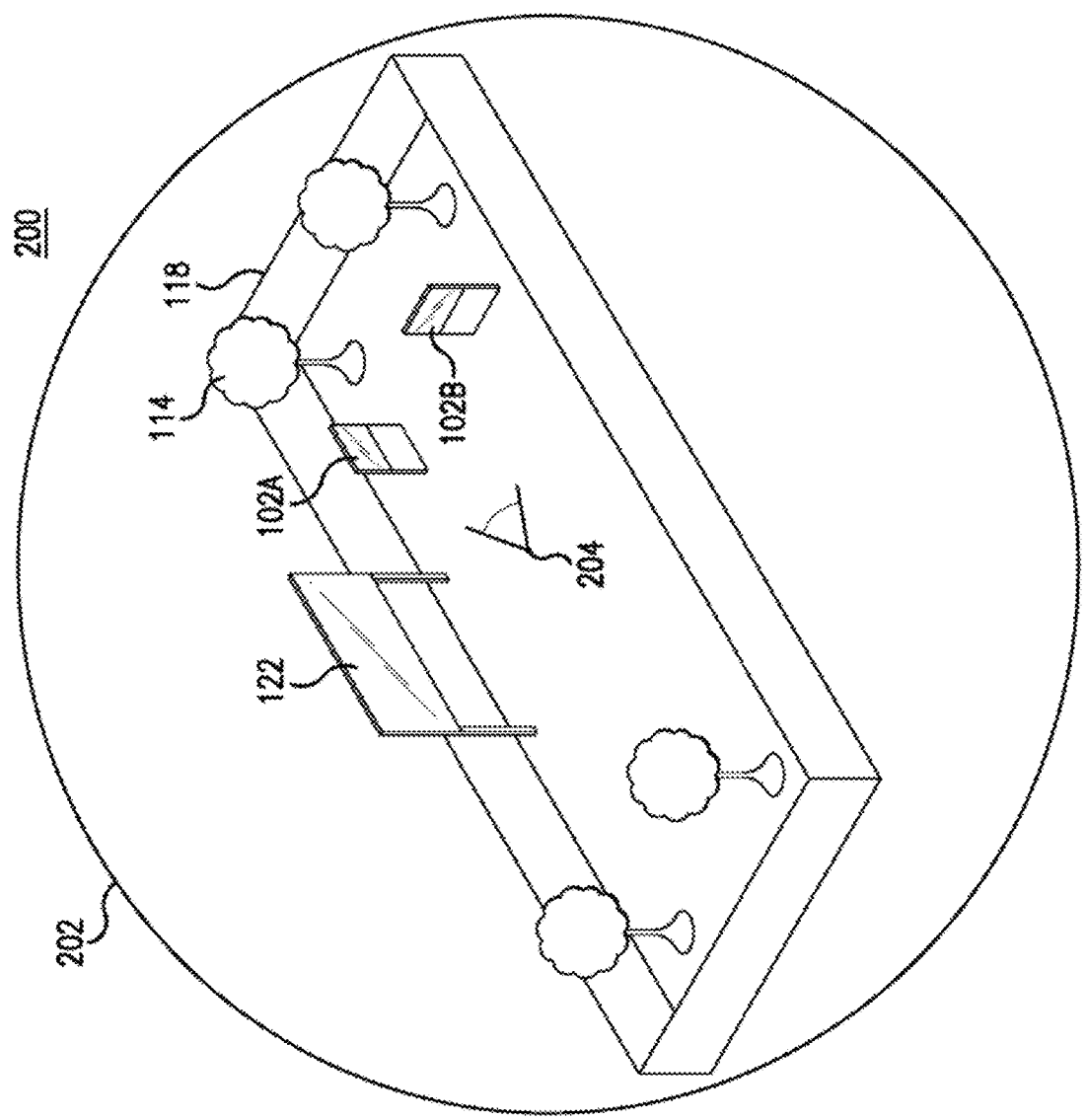
FIG. 2 is a diagram illustrating a three-dimensional model used to render a virtual environment with avatars for videoconferencing.

FIG. 2 is a diagram 200 illustrating a three-dimensional model used to render a virtual environment with avatars for videoconferencing. Just as illustrated in FIG. 1, the virtual environment here includes a three-dimensional arena 118, and various three-dimensional models, including three-dimensional models 114 and 122. Also as illustrated in FIG. 1, diagram 200 includes avatars 102A and B navigating around the virtual environment.

As described above, interface 100 in FIG. 1 is rendered from the perspective of a virtual camera. That virtual camera is illustrated in diagram 200 as virtual camera 204. As mentioned above, the user viewing interface 100 in FIG. 1 can control virtual camera 204 and navigate the virtual camera in three-dimensional space. Interface 100 is constantly being updated according to the new position of virtual camera 204 and any changes of the models within the field of view of virtual camera 204. As described above, the field of view of virtual camera 204 may be a frustum defined, at least in part, by horizontal and vertical field of view angles.

As described above with respect to FIG. 1, a background image, or texture, may define at least part of the virtual environment. The background image may capture aspects of the virtual environment that are meant to appear at a distance. The background image may be texture mapped onto a sphere 202. The virtual camera 204 may be at an origin of the sphere 202. In this way, distant features of the virtual environment may be efficiently rendered.

In other aspects, other shapes instead of sphere 202 may be used to texture map the background image. In various alternative aspects, the shape may be a cylinder, cube, rectangular prism, or any other three-dimensional geometric shape.

Figure 3:
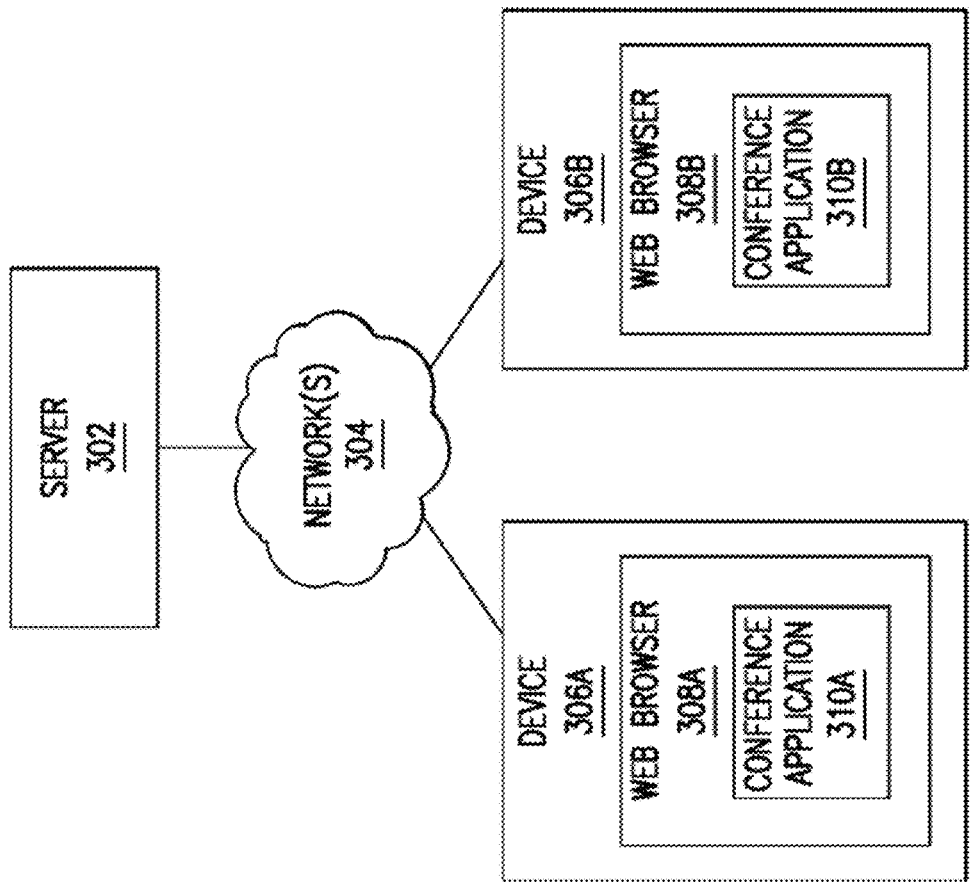
FIG. 3 is a diagram illustrating a system that provides videoconferences in a virtual environment.

FIG. 3 is a diagram illustrating a system 300 that provides videoconferences in a virtual environment. System 300 includes a server 302 coupled to devices 306A and B via one or more networks 304.

Server 302 provides the services to connect a videoconference session between devices 306A and 306B. As will be described in greater detail below, server 302 communicates notifications to devices of conference participants (e.g., devices 306A-B) when new participants join the conference and when existing participants leave the conference. Server 302 communicates messages describing a position and direction in a three-dimensional virtual space for respective participant's virtual cameras within the three-dimensional virtual space. Server 302 also communicates video and audio streams between the respective devices of the participants (e.g., devices 306A-B). Finally, server 302 stores and transmits data describing data specifying a three-dimensional virtual space to the respective devices 306A-B.

In addition to the data necessary for the virtual conference, server 302 may provide executable information that instructs the devices 306A and 306B on how to render the data to provide the interactive conference.

Server 302 responds to requests with a response. Server 302 may be a web server. A web server is software and hardware that uses HTTP (Hypertext Transfer Protocol) and other protocols to respond to client requests made over the World Wide Web. The main job of a web server is to display website content through storing, processing and delivering webpages to users.

In an alternative aspect, communication between devices 306A-B happens not through server 302 but on a peer-to-peer basis. In that aspect, one or more of the data describing the respective participants' location and direction, the notifications regarding new and existing participants, and the video and audio streams of the respective participants are communicated not through server 302 but directly between devices 306A-B.

Network 304 enables communication between the various devices 306A-B and server 302. Network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

Devices 306A-B are each devices of respective participants to the virtual conference. Devices 306A-B each receive data necessary to conduct the virtual conference and render the data necessary to provide the virtual conference. As will be described in greater detail below, devices 306A-B include a display to present the rendered conference information, inputs that allow the user to control the virtual camera, a speaker (such as a headset) to provide audio to the user for the conference, a microphone to capture a user's voice input, and a camera positioned to capture video of the user's face.

Devices 306A-B can be any type of computing device, including a laptop, a desktop, a smartphone, a tablet computer, or a wearable computer (such as a smartwatch or a augmented reality or virtual reality headset).

Web browser 308A-B can retrieve a network resource (such as a webpage) addressed by the link identifier (such as a uniform resource locator, or URL) and present the network resource for display. In particular, web browser 308A-B is a software application for accessing information on the World Wide Web. Usually, web browser 308A-B makes this request using the hypertext transfer protocol (HTTP or HTTPS). When a user requests a web page from a particular website, the web browser retrieves the necessary content from a web server, interprets and executes the content, and then displays the page on a display on device 306A-B shown as client/counterpart conference application 310A-B. In examples, the content may have HTML and client-side scripting, such as JavaScript. Once displayed, a user can input information and make selections on the page, which can cause web browser 308A-B to make further requests.

Conference application 310A-B may be a web application downloaded from server 302 and configured to be executed by the respective web browsers 308A-B. In an aspect, conference application 310A-B may be a JavaScript application. In one example, conference application 310A-B may be written in a higher-level language, such as a Typescript language, and translated or compiled into JavaScript. Conference application 310A-B is configured to interact with the WebGL JavaScript application programming interface. It may have control code specified in JavaScript and shader code written in OpenGL ES Shading Language (GLSL ES). Using the WebGL API, conference application 310A-B may be able to utilize a graphics processing unit (not shown) of device 306A-B. Moreover, OpenGL rendering of interactive two-dimensional and three-dimensional graphics without the use of plug-ins is also possible.

Conference application 310A-B receives the data from server 302 describing position and direction of other avatars and three-dimensional modeling information describing the virtual environment. In addition, conference application 310A-B receives video and audio streams of other conference participants from server 302.

Conference application 310A-B renders three three-dimensional modeling data, including data describing the three-dimensional environment and data representing the respective participant avatars. This rendering may involve rasterization, texture mapping, ray tracing, shading, or other rendering techniques. In an aspect, the rendering may involve ray tracing based on the characteristics of the virtual camera. Ray tracing involves generating an image by tracing a path of light as pixels in an image plane and simulating the effects of encounters with virtual objects. In some aspects, to enhance realism, the ray tracing may simulate optical effects such as reflection, refraction, scattering, and dispersion.

In this way, the user uses web browser 308A-B to enter a virtual space. The scene is displayed on the screen of the user. The webcam video stream and microphone audio stream of the user are sent to server 302. When other users enter the virtual space an avatar model is created for them. The position of this avatar is sent to the server and received by the other users. Other users also get a notification from server 302 that an audio/video stream is available. The video stream of a user is placed on the avatar that was created for that user. The audio stream is played back as coming from the position of the avatar.

Figure 4B:
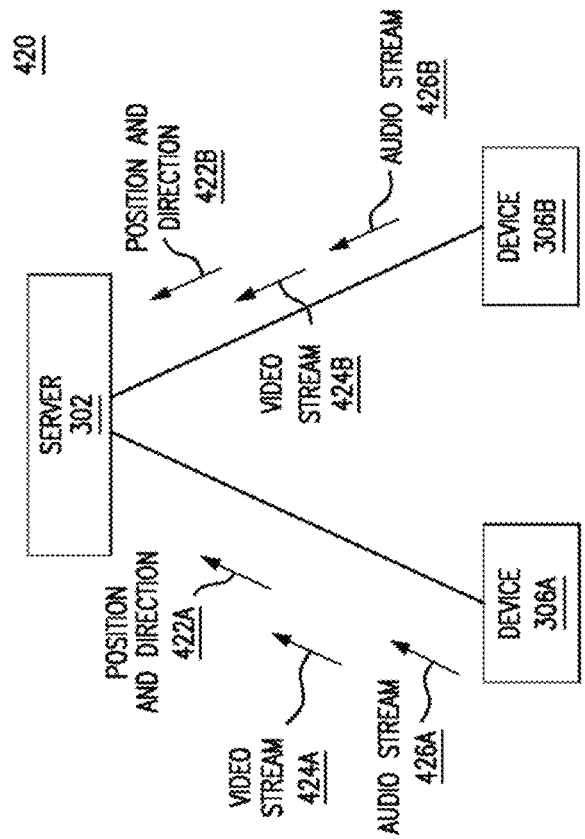
FIGS. 4A-4C illustrate how data is transferred between various components of the system in FIG. 3 to provide videoconferencing.
Figure 4A:
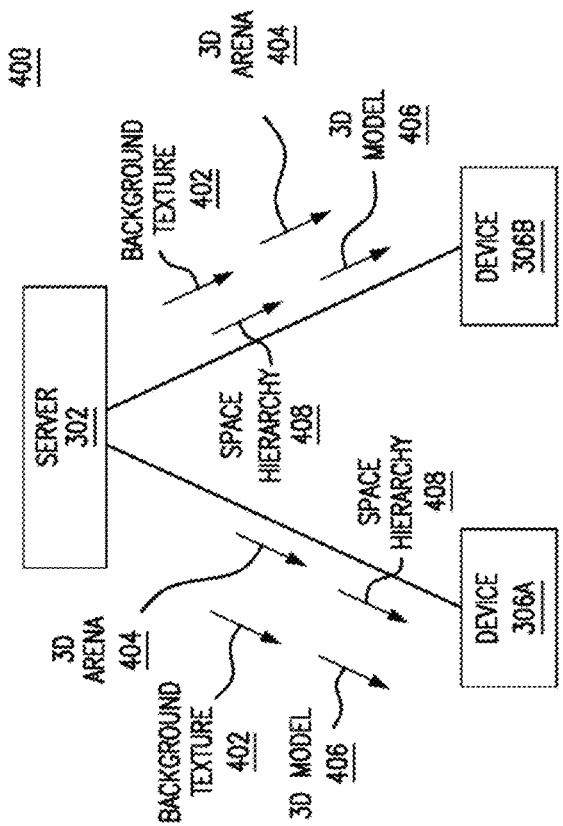
Figure 4C:
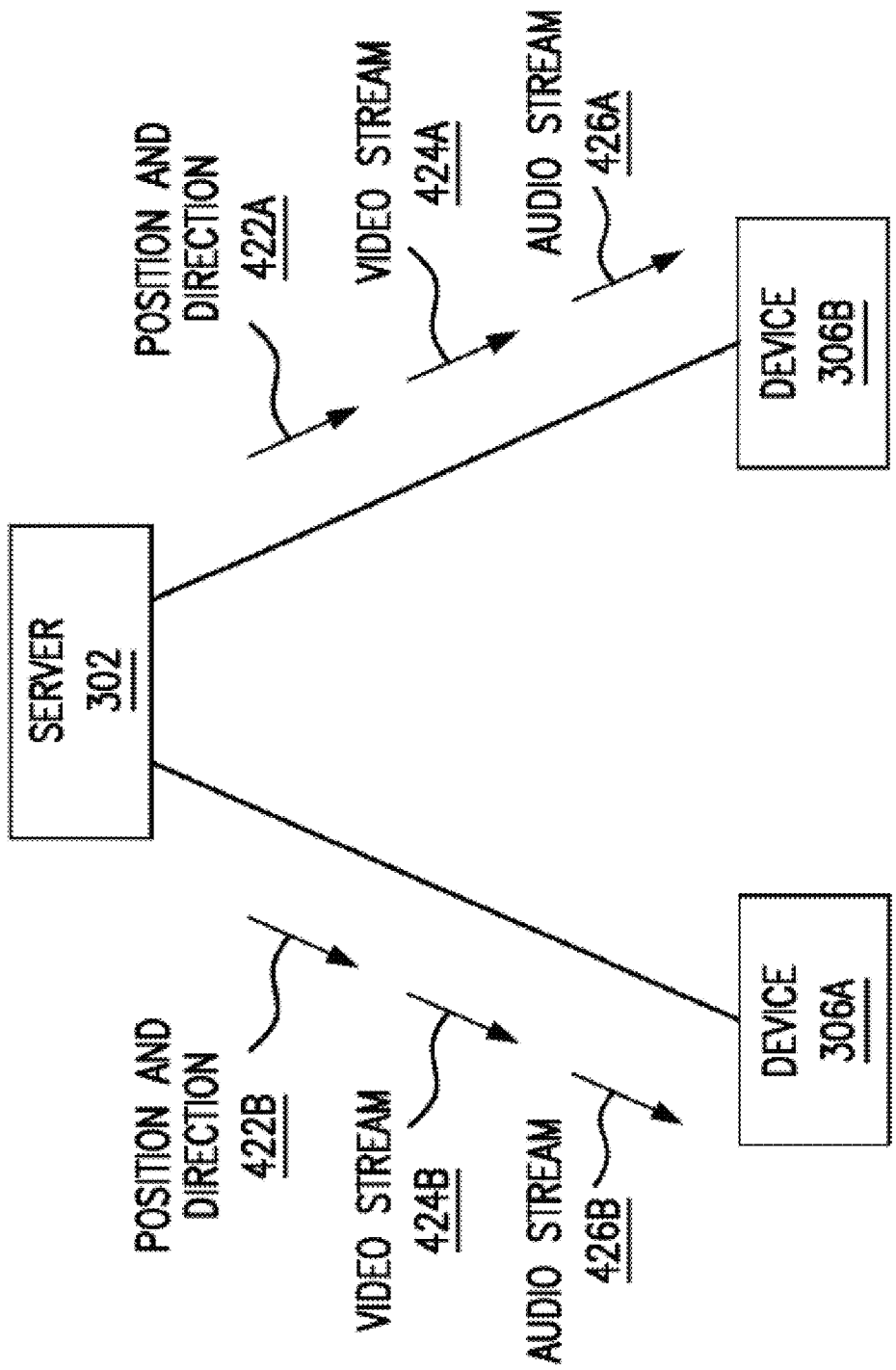

FIGS. 4A-C illustrate how data is transferred between various components of the system in FIG. 3 to provide videoconferencing. Like FIG. 3, each of FIGS. 4A-C depict the connection between server 302 and devices 306A and B. In particular, FIGS. 4A-C illustrate example data flows between those devices.

FIG. 4A illustrates a diagram 400 illustrating how server 302 transmits data describing the virtual environment to devices 306A and B. In particular, both devices 306A and B, receive from server 302 the three-dimensional arena 404, background texture 402, space hierarchy 408 and any other three-dimensional modeling information 406.

As described above, background texture 402 is an image illustrating distant features of the virtual environment. The image may be regular (such as a brick wall) or irregular. Background texture 402 may be encoded in any common image file format, such as bitmap, JPEG, GIF, or other file image format. It describes the background image to be rendered against, for example, a sphere at a distance.

Three-dimensional arena 404 is a three-dimensional model of the space in which the conference is to take place. As described above, it may include, for example, a mesh and possibly its own texture information to be mapped upon the three-dimensional primitives it describes. It may define the space in which the virtual camera and respective avatars can navigate within the virtual environment. Accordingly, it may be bounded by edges (such as walls or fences) that illustrate to users the perimeter of the navigable virtual environment.

Space hierarchy 408 is data specifying partitions in the virtual environment. These partitions are used to determine how sound is processed before being transferred between participants. As will be described below, this partition data may be hierarchical and may describe sound processing to allow for areas where participants to the virtual conference can have private conversations or side conversations.

Three-dimensional model 406 is any other three-dimensional modeling information needed to conduct the conference. In one aspect, this may include information describing the respective avatars. Alternatively or additionally, this information may include product demonstrations.

With the information needed to conduct the meeting sent to the participants, FIGS. 4B-C illustrate how server 302 forwards information from one device to another. FIG. 4B illustrates a diagram 420 showing how server 302 receives information from respective devices 306A and B, and FIG. 4C illustrates a diagram 460 showing how server 302 transmits the information to respective devices 306B and A. In particular, device 306A transmits position and direction 422A, video stream 424A, and audio stream 426A to server 302, which transmits position and direction 422A, video stream 424A, and audio stream 426A to device 306B. And device 306B transmits position and direction 422B, video stream 424B, and audio stream 426B to server 302, which transmits position and direction 422B, video stream 424B, and audio stream 426B to device 306A.

Position and direction 422A-B describe the position and direction of the virtual camera for the user of device 306A. As described above, the position may be a coordinate in three-dimensional space (e.g., x, y, z coordinate) and the direction may be a direction in three-dimensional space (e.g., pan, tilt, roll). In some aspects, the user may be unable to control the virtual camera's roll, so the direction may only specify pan and tilt angles. Similarly, in some aspects, the user may be unable to change the avatar's z coordinate (as the avatar is bounded by virtual gravity), so the z coordinate may be unnecessary. In this way, position and direction 422A-B each may include at least a coordinate on a horizontal plane in the three-dimensional virtual space and a pan and tilt value. Alternatively or additionally, the user may be able to "jump" it's avatar, so the Z position may be specified only by an indication of whether the user is jumping their avatar.

In different examples, position and direction 422A-B may be transmitted and received using HTTP request responses or using socket messaging.

Video stream 424A-B is video data captured from a camera of the respective devices 306A and B. The video may be compressed. For example, the video may use any commonly known video codecs, including MPEG-4, VP8, or H.264. The video may be captured and transmitted in real time.

Similarly, audio stream 426A-B is audio data captured from a microphone of the respective devices. The audio may be compressed. For example, the video may use any commonly known audio codecs, including MPEG-4 or Vorbis. The audio may be captured and transmitted in real time. Video stream 424A and audio stream 426A are captured, transmitted, and presented synchronously with one another. Similarly, video stream 424B and audio stream 426B are captured, transmitted, and presented synchronously with one another.

The video stream 424A-B and audio stream 426A-B may be transmitted using the WebRTC application programming interface. The WebRTC is an API available in JavaScript. As described above, devices 306A and B download and run web applications, as conference applications 310A and B, and conference applications 310A and B may be implemented in JavaScript. Conference applications 310A and B may use WebRTC to receive and transmit video stream 424A-B and audio stream 426A-B by making API calls from its JavaScript.

As mentioned above, when a user leaves the virtual conference, this departure is communicated to all other users. For example, if device 306A exits the virtual conference, server 302 would communicate that departure to device 306B. Consequently, device 306B would stop rendering an avatar corresponding to device 306A, removing the avatar from the virtual space. Additionally, device 306B will stop receiving video stream 424A and audio stream 426A.

As described above, conference applications 310A and B may periodically or intermittently re-render the virtual space based on new information from respective video streams 424A and B, position and direction 422A and B, and new information relating to the three-dimensional environment. For simplicity, each of these updates are now described from the perspective of device 306A. However, a skilled artisan would understand that device 306B would behave similarly given similar changes.

As device 306A receives video stream 424B, device 306A texture maps frames from video stream 424A on to an avatar corresponding to device 306B. That texture mapped avatar is re-rendered within the three-dimensional virtual space and presented to a user of device 306A.

As device 306A receives a new position and direction 422B, device 306A generates the avatar corresponding to device 306B positioned at the new position and oriented at the new direction. The generated avatar is re-rendered within the three-dimensional virtual space and presented to the user of device 306A.

In some aspects, server 302 may send updated model information describing the three-dimensional virtual environment. For example, server 302 may send updated information 402, 404, 406, or 408. When that happens, device 306A will re-render the virtual environment based on the updated information. This may be useful when the environment changes over time. For example, an outdoor event may change from daylight to dusk as the event progresses.

Again, when device 306B exits the virtual conference, server 302 sends a notification to device 306A indicating that device 306B is no longer participating in the conference. In that case, device 306A would re-render the virtual environment without the avatar for device 306B.

While FIG. 3 in FIGS. 4A-4C is illustrated with two devices for simplicity, a skilled artisan would understand that the techniques described herein can be extended to any number of devices. Also, while FIG. 3 in FIGS. 4A-4C illustrates a single server 302, a skilled artisan would understand that the functionality of server 302 can be spread out among a plurality of computing devices. In an aspect, the data transferred in FIG. 4A may come from one network address for server 302, while the data transferred in FIGS. 4B-4C can be transferred to/from another network address for server 302.

In one aspect, participants can set their webcam, microphone, speakers and graphical settings before entering the virtual conference. In an alternative aspect, after starting the application, users may enter a virtual lobby where they are greeted by an avatar controlled by a real person. This person is able to view and modify the webcam, microphone, speakers and graphical settings of the user. The attendant can also instruct the user on how to use the virtual environment, for example by teaching them about looking, moving around and interacting. When they are ready, the user automatically leaves the virtual waiting room and joins the real virtual environment.

Resituating Virtual Cameras and Avatars in a Virtual Environment

Figure 5A:
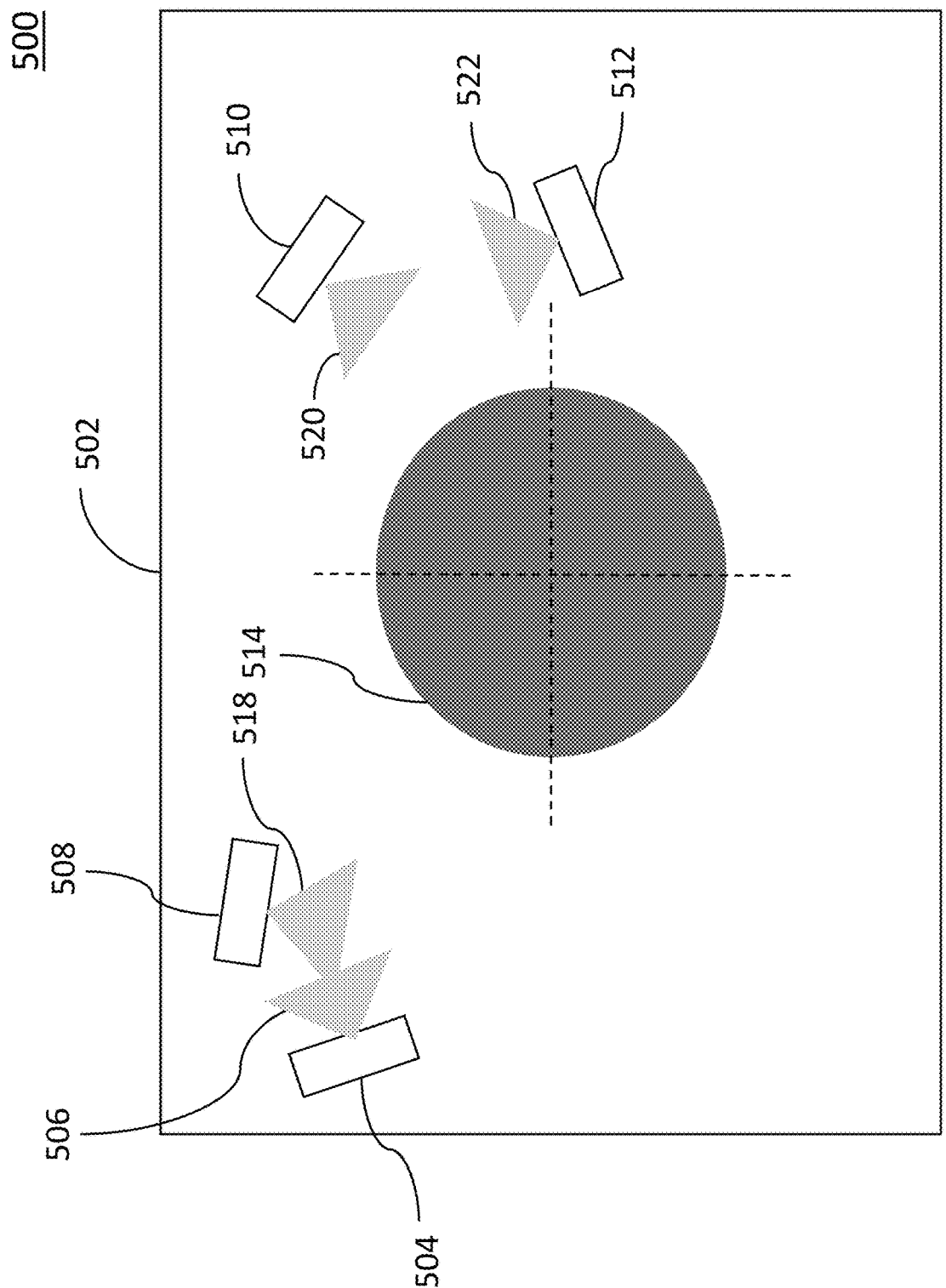
FIGS. 5A-5B are diagrams illustrating resituating virtual cameras and avatars in a virtual environment.
Figure 5B:
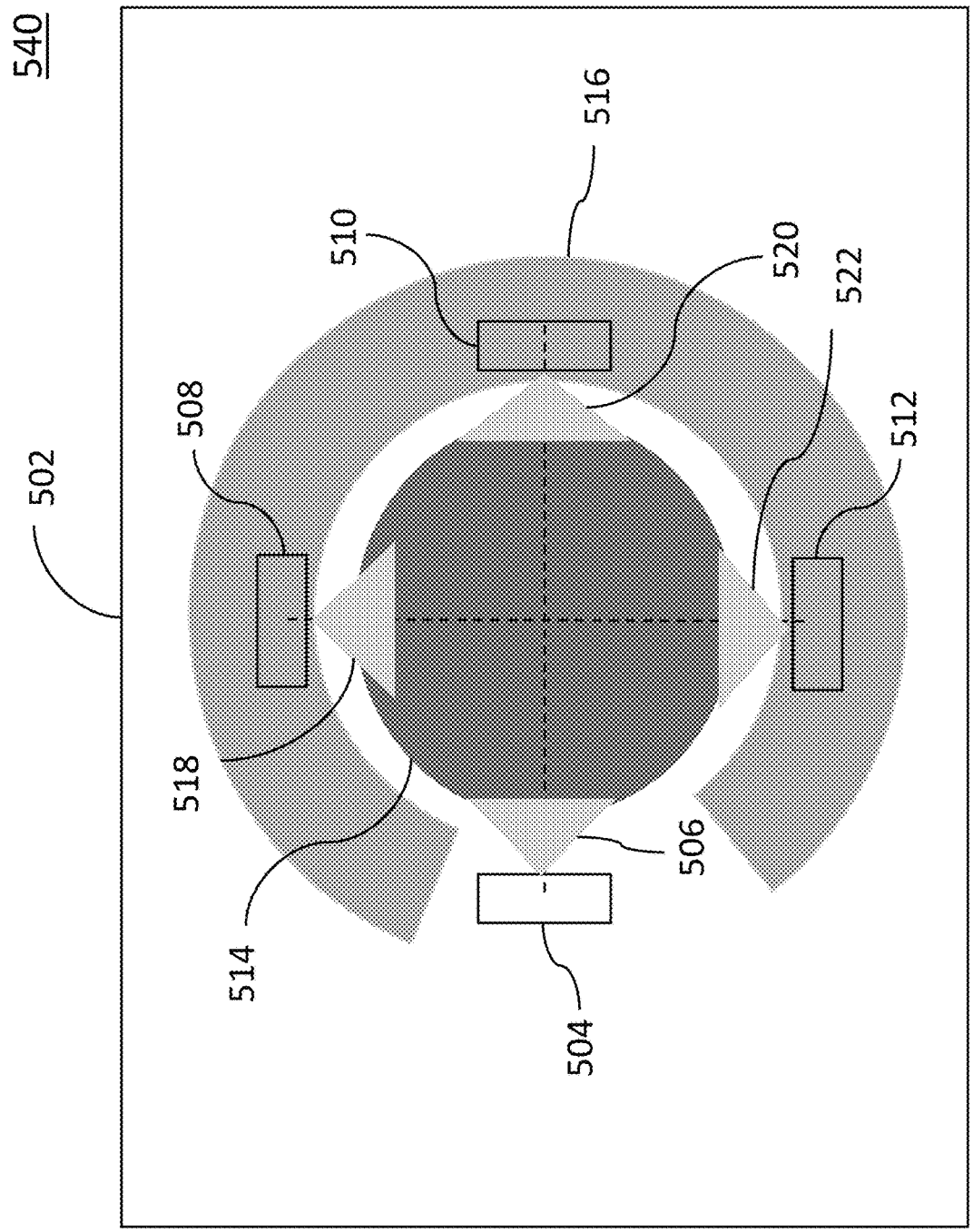

FIGS. 5A-5B are diagrams illustrating resituating virtual cameras and avatars in a virtual environment. FIG. 5A is a diagram 500 illustrating avatars and virtual cameras in a virtual environment 502. In some aspects, virtual environment 502 may be configured to support at least two users. In this aspect, each user has a corresponding avatar in virtual environment 502 and views virtual environment 502 through a virtual camera. The user's virtual camera can exist at the location of the user's avatar. And in some aspects, the user can control or navigate the location and direction of their avatar and virtual camera.

For example, diagram 500 includes a first avatar 504 corresponding to a first virtual camera 506, both controllable by a first user; a second avatar 508 corresponding to a second virtual camera 518, both controllable by a second user; a third avatar 510 corresponding to a third virtual camera 520, both controllable by a third user; and a fourth avatar 512 corresponding to a fourth virtual camera 522, both controllable by a fourth user. Diagram 500 also includes a point, and can include an object 514 positioned in virtual environment 502 around the point. However, virtual environment 502 is not limited to that aspect. Virtual environment 502 can support configurations of one user, at least two users, at least three users, at least four users, or as many users as can interact within virtual environment 502.

In virtual environment 502, at least two users can interact with one another through the environment. Each user may view the virtual environment and control their avatar and virtual camera through a user device. Each user device can be understood with reference to devices 306A and 306B, as described in FIGS. 3 and 11. For example, the first user can position their avatar 504 and their virtual camera 506 towards a second user's avatar 508 and their virtual camera 518 using a first user device (e.g., 306A). In another example, a third user can position their avatar 510 and their virtual camera 520 towards a fourth user's avatar 512 and their virtual camera 522 using a third user device. In both of these examples, each user can view, through their virtual camera, a perspective of the avatar of at least one other user (i.e., viewing the other user's avatar, which can include a texture mapped video of the other user as described with reference to interface 100). Likewise, each user can hear sounds from the other users. From the perspective of any one of the user's virtual cameras, the avatars can exist in a certain clockwise ordering within virtual environment 502.

But because there are multiple users using virtual environment 502 (i.e., multiple avatars with virtual environment 502), it may be difficult for a user to view the other users. For example, the first user interacting with virtual environment 502 through avatar 504 and virtual camera 506 may be unable to clearly see the fourth user interacting with virtual environment 502 through avatar 512 and virtual camera 522.

The point in virtual environment 502 can be a central point or a point located elsewhere. The location of the point can be determined by two ([x, y] coordinates) or three-dimensional parameters ([x, y, z] coordinates). For example, the point can be located at the origin of virtual environment 502, having three-dimensional parameters of [0, 0, 0]. In virtual environment 502, object 514 can be a visible or invisible object. In visible form, object 514 can be a virtual table, a virtual chair, a virtual desk, or any other virtual object visible through a user's virtual camera as would be appreciated by a person of ordinary skill in the art. In invisible form, object 514 can be a computed point, a computed shape, or any other computed object not visible through a user's virtual camera as would be appreciated by a person of ordinary skill in the art. Object 514 can be centered around a point in virtual environment 502. For example, object 514 can be placed at the center of virtual environment 502. Object 514 can also be round in shape, having a central point. However, object 514 is not limited to these aspects. Users can interact with one another around and over object 514, in the same way that interactions can occur in a real-world environment.

A user may desire to assemble at least one other user (e.g., the other user's avatar, whereby the other user's virtual camera can move with the avatar) around a point or object 514 in virtual environment 502 to enable better interaction between the users. In some aspects, upon a certain input from a user, virtual environment 502 can transition from the configuration illustrated in diagram 500 to the configuration illustrated in diagram 540. In other aspects, virtual environment 502 can transition from the configuration illustrated in diagram 500 to the configuration illustrated in diagram 540 without input from a user.

FIG. 5B is a diagram 540 illustrating resituating virtual cameras and avatars in a virtual environment 502. Similar to diagram 500, diagram 540 includes first avatar 504 corresponding to first virtual camera 506, both controllable by a first user; second avatar 508 corresponding to second virtual camera 518, both controllable by a second user; third avatar 510 corresponding to third virtual camera 520, both controllable by a third user; and fourth avatar 512 corresponding to fourth virtual camera 522, both controllable by a fourth user. Diagram 540 also includes a point, and can include object 514 positioned in virtual environment 502 around the point, and an area of space 516.

In some aspects, a user has provided an input that has activated a transition from the configuration illustrated in diagram 500 to the configuration illustrated in diagram 540. For example, a first user can enter a key combination on a keyboard to activate the transition. In another example, a first user navigates their avatar and virtual camera into virtual environment 502 or towards object 514 to activate the transition. In other aspects, virtual environment 502 has transitioned from the configuration illustrated in diagram 500 to the configuration illustrated in diagram 540 without input from a user. In further aspects, virtual environment 502 has transitioned from the configuration illustrated in diagram 500 to the configuration illustrated in diagram 540 either with or without input from a user, but where each user must consent to the transition. For example, each user can be assigned a location around a point in virtual environment 502 or object 514 and can receive a prompt on their device display, asking for consent to resituate their avatar and/or virtual camera to the assigned location around the point in virtual environment 502 or object 514.

Upon this input, consent, or transition, the users are virtually resituated around the point in virtual environment 502 or object 514. In some aspects, the users' avatars and virtual cameras are resituated around the point or object 514, and their avatars' original positions have been recorded. In this aspect, a keystroke is configured to allow the users' avatars and virtual cameras to return to their original positions. In other aspects, the users' avatars and virtual cameras are both resituated around the point or object 514 without regard to original positions. In either aspect scenario, the avatars and virtual cameras can be resituated in accordance with a clockwise ordering found prior to the transition, such as that illustrated in diagram 500. If there are two users, each users' avatar and virtual camera can be positioned or resituated opposite one another around the point or object 514. If there are more than two users, each users' avatar and virtual camera can be positioned or resituated substantially equidistant from one another around the point or object 514.

In an example aspect in rendered virtual environment 502, a first user may desire to assemble other (e.g., three) users around a point in virtual environment 502 or object 514 to enable better interaction between the users. Each user may view virtual environment 502 and control their avatar and virtual camera through a device. For example, a first user may view virtual environment 502 and control their avatar and virtual camera through a first device. Upon input, consent (e.g., a prompt on their device display), or an automatic transition (e.g., the first user entering a key combination on the first device), locations can be selected for each user around a point in virtual environment 502 or object 514 in virtual environment 502. A first user's virtual camera 506 and/or avatar 504 may be repositioned around the point or object 514. This can be considered a first location. The first location can be calculated based on a size of object 514 (e.g., a diameter), a size of the user's avatars (e.g., avatars 504, 508, 510, 512), a distance between object 514 and the avatars, a size of the first user's web browser, and/or a size of virtual environment 502 (e.g., a distance between virtual walls). The distance between object 514 and the avatars can be predetermined or dynamically calculated using the other possible inputs. The first user's virtual camera 506 and/or avatar 504 can be oriented to face the point or object 514 (i.e., towards the center of virtual environment 502). Locations are also selected around the point or object 514 to resituate the other users. These locations can be considered second, third, or fourth (etc.) locations. The locations can be within area of space 516 surrounding the point or object 514. The area of space 516 can be calculated from an area surrounding the point or object 514 and can be considered a spacing natural to users in a real-world environment. For example, object 514 can be a table and area of space 516 can be an area surrounding the table where users would normally sit in a chair. Specifically, the locations and/or area of space 516 can be calculated based on a size of object 514 (e.g., a diameter), a size of the user's avatars (e.g., avatars 504, 508, 510, 512), a distance between object 514 and the avatars, a size of the users' web browsers, and/or a size of virtual environment 502 (e.g., a distance between virtual walls). The distance between object 514 and the avatars can be predetermined or dynamically calculated using the other possible inputs.

Further in the example aspect, the second user's avatar 508 can be resituated to the second location around the point or object 514, such as in the area of space 516. Avatar 508 can be oriented to face the point or object 514 (i.e., towards the center of virtual environment 502). The third and fourth users' avatars 510 and 512 can also be resituated to the third and fourth locations around the point or object 514, and oriented to face the point or object 514. The second, third, and fourth locations can all be within the area of space 516, and the locations can be substantially equidistant from one another and the first location within the area of space 516. From the perspective of first user's virtual camera 506, through the first device, the first user may view all user avatars now situated around the point or object 514 and within the view of virtual camera 506. To similarly correct the perspectives of the other users' virtual camera 518, 520, and 522, instructing messages can be sent to their devices (e.g., second device, third device, fourth device) for their virtual cameras to be resituated to the locations of their respective avatars 508, 510, 512 (e.g., second location, third location, fourth location). The devices can also be instructed to orient the virtual cameras 518, 520, and 522 to face the point or object 514.

Avatars 504, 508, 510, and 512 original positions can be recorded so that the avatars and virtual cameras 506, 518, 520, and 522 can eventually be returned to the original locations. Avatars 504, 508, 510, and 512 and virtual cameras 506, 518, 520, and 522 can be resituated in a clockwise ordering corresponding to the ordering that existed prior to the transition (e.g., illustrated by diagram 500). Each user's avatar is now positioned around a point in virtual environment 502 or a virtual object 514 (e.g., a virtual table). And each user now views, through their virtual camera, the avatars of the other users positioned around the point or the virtual object (e.g., a virtual table). Instead of being positioned about virtual environment 502, the users can now easily interact with one another.

In some aspects, the transition from the configuration illustrated in diagram 500 to the configuration illustrated in diagram 540 includes animations of the transition. For example, as the first user's avatar 504 and virtual camera 506 are positioned around a point or object 514, the first user and at least one other user may perceive avatar 504 moving from its original location to around the point or object 514 through their virtual cameras. Likewise, as at least one other user's avatar (e.g., avatar 508) and virtual camera (e.g., virtual camera 518) is resituated to a selected location around the point or object 514, the users may perceive the avatar as moving from its original location to the location around the point or object 514 through their virtual cameras. These animations can occur as a user navigates their avatar and virtual camera towards the point or object 514.

In some aspects, the above described principles of selecting a location, repositioning and resituating avatars and virtual cameras, and instructing corresponding devices to perform similar operations can be applied to entities other than user avatars and virtual cameras. For example, viewing screens or objects (e.g., object 514) within virtual environment 502 can be resituated in accordance with the above described principles.

In some aspects, users can remain positioned or resituated around the point or object 514 until the transition is disabled or until one of the users leaves virtual environment 502. If the transition is disabled, then virtual environment 502 can transition from the configuration illustrated in diagram 540 to the configuration illustrated in diagram 500. For example, a first user can enter a key combination on a keyboard to end the transition. If a user leaves virtual environment 502, if a user rearranges themselves through movement of their avatar and virtual camera, or if a new user joins virtual environment 502, virtual environment 502 can transition from the configuration illustrated in diagram 540 to the configuration illustrated in diagram 500. Alternatively, a further resituating process as described above can occur.

Figure 6A:
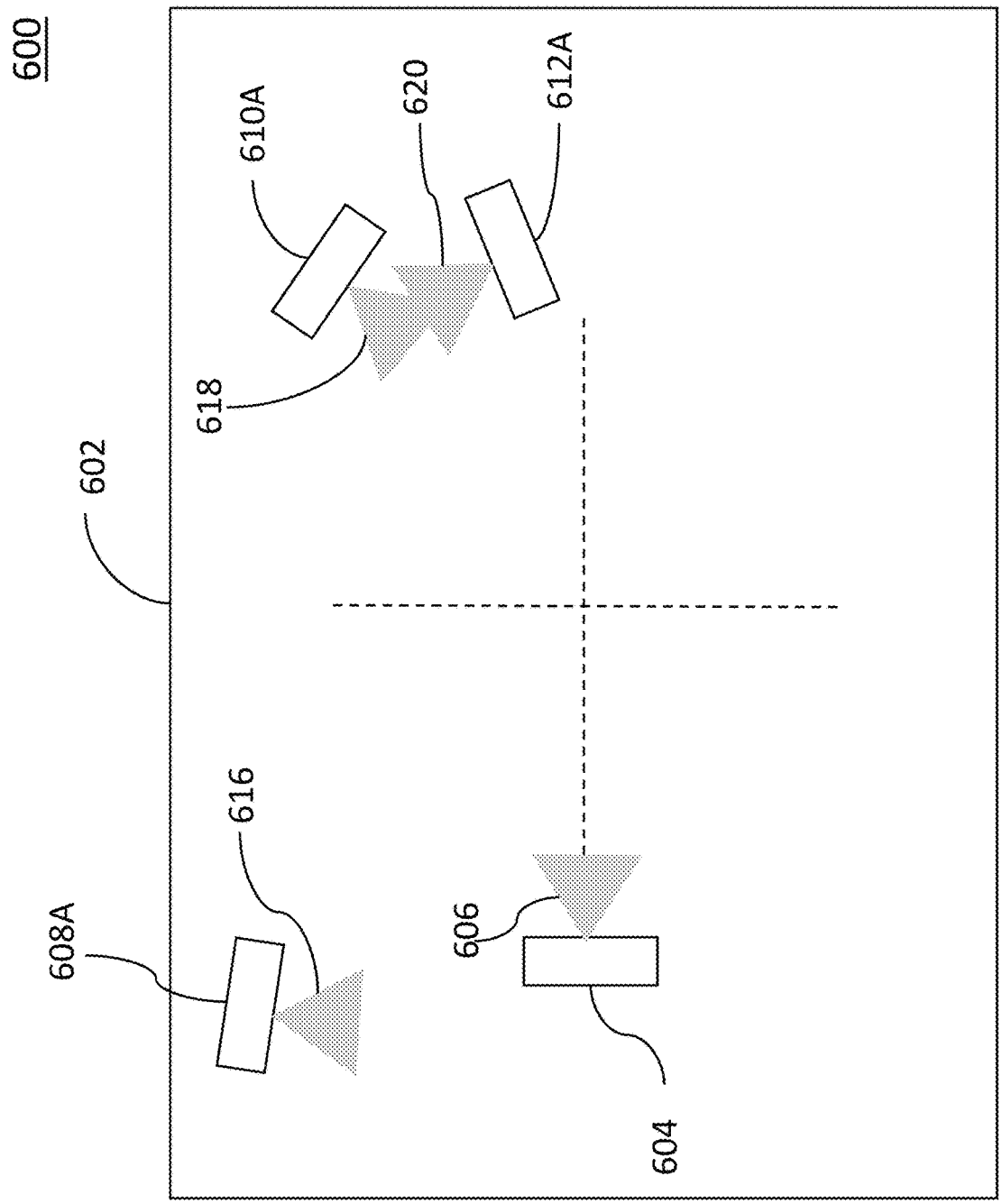
FIGS. 6A-6B are diagrams illustrating resituating avatars in a virtual environment, without resituating corresponding virtual cameras.
Figure 6B:
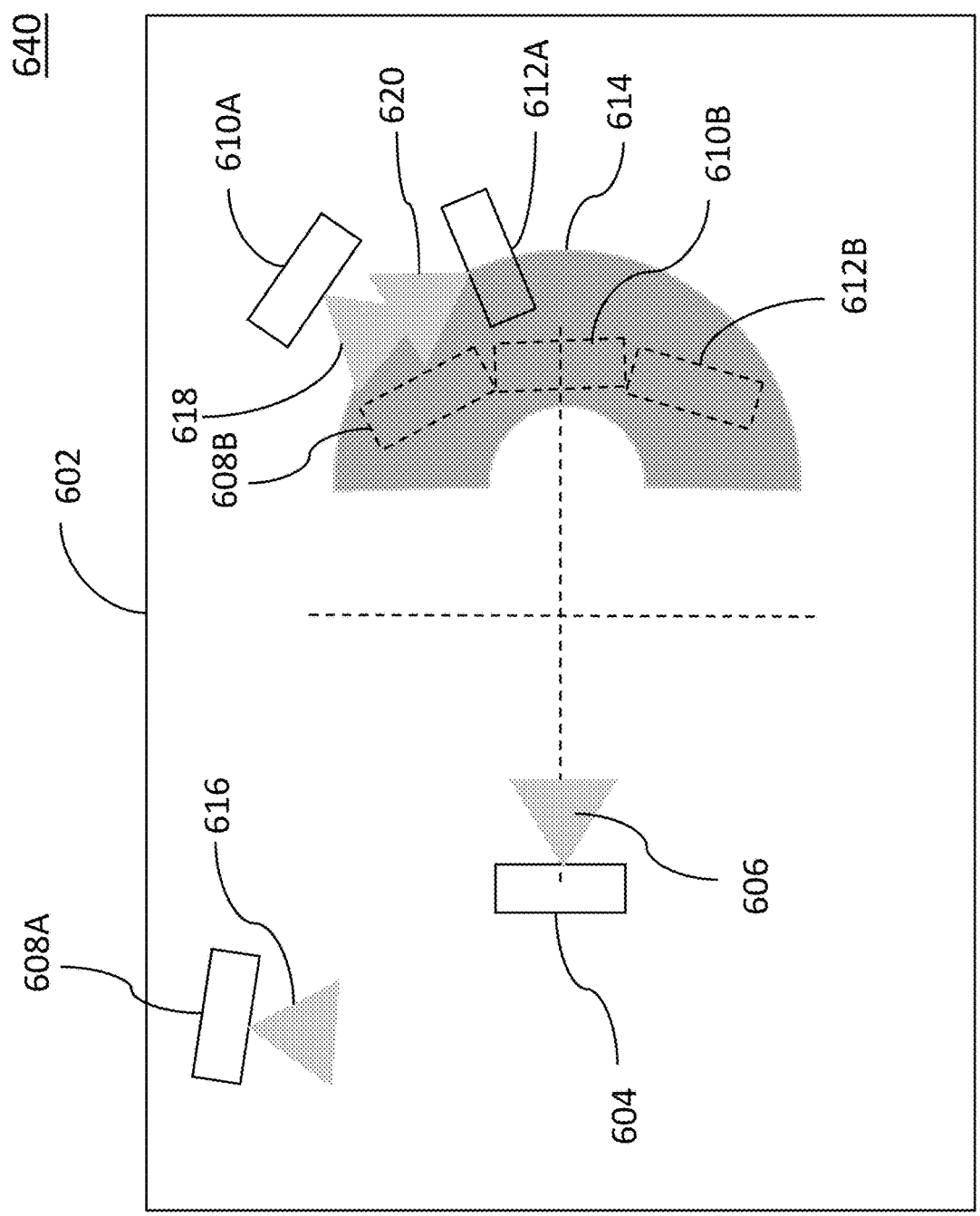

FIGS. 6A-6B are diagrams illustrating resituating avatars in a virtual environment, without resituating corresponding virtual cameras. In this way, FIG. 6A is a diagram 600 illustrating avatars and virtual cameras in a virtual environment 602. In some aspects, virtual environment 602 may be configured to support at least two users. In this aspect, each user has a corresponding avatar in virtual environment 602 and views virtual environment 602 through a virtual camera. The user's virtual camera can exist at the location of the user's avatar. And in some aspects, the user can control or navigate the location and direction of their avatar and virtual camera. Diagram 600 includes a first avatar 604 corresponding to a first virtual camera 606, both controllable by a first user; a second avatar 608A corresponding to a second virtual camera 616; a third avatar 610A corresponding to a third virtual camera 618; and a fourth avatar 612A corresponding to a fourth virtual camera 620. However, virtual environment 602 is not limited to that aspect and can have, for example, an object 514 as illustrated in FIGS. 5A-5B. Virtual environment 602 can support configurations of one user, at least two users, at least three users, at least four users, or as many users as can interact within virtual environment 602.

In virtual environment 602, at least two users can interact with one another through the environment. Each user may view the virtual environment and control their avatar and virtual camera through a user device. Each user device can be understood with reference to devices 306A and 306B, as described in FIGS. 3 and 11. For example, the first user can position their avatar 604 and their virtual camera 606 towards a second user's avatar 608A and their virtual camera 616 using a first user device (e.g., 306A). In another example, a third user can position their avatar 610A and their virtual camera 618 towards a fourth user's avatar 612A and their virtual camera 620 using a third user device. In both of these examples, each user can view, through their virtual camera, a perspective of the avatar of at least one other user (i.e., viewing the other user's avatar, which can include a texture mapped video of the other user as described with reference to interface 100). Likewise, each user can hear sounds from the other users. From the perspective of any one of the user's virtual cameras, the avatars can exist in a certain clockwise ordering within virtual environment 602. But because there are multiple users using virtual environment 602 (i.e., multiple avatars within virtual environment 602), it may be difficult for a user to view the other user. For example, the first user interacting with virtual environment 602 through avatar 604 and virtual camera 606 may be unable to clearly see the fourth user interacting with virtual environment 602 through avatar 612A and virtual camera 620.

A user may desire to move at least one other user (e.g., the other user's avatar) to a new location in virtual environment 602 to enable better interaction between the users. However, unlike virtual environment 502, the user may desire to change their own perception of the at least one other user's avatar without altering the other user's perspective. In other words, a user may desire to only perceive that the at least one other user's avatar has changed positions.

In some aspects, upon a certain input from a user, virtual environment 602 can transition from the configuration illustrated in diagram 600 to the configuration illustrated in diagram 640. In other aspects, virtual environment 602 can transition from the configuration illustrated in diagram 600 to the configuration illustrated in diagram 640 without input from a user.

FIG. 6B is a diagram 640 illustrating resituating avatars in a virtual environment 602, without resituating corresponding virtual cameras. Similar to diagram 600, diagram 640 includes first avatar 604 corresponding to first virtual camera 606; second avatar 608A corresponding to second virtual camera 616; third avatar 610A corresponding to third virtual camera 618; and fourth avatar 612A corresponding to fourth virtual camera 620. Diagram 640 also includes a perceived second avatar 608B, a perceived third avatar 610B, a perceived fourth avatar 612B, and an area of space 614.

In an example aspect, a first user desires to perceive that at least one other user's avatar (e.g., avatars 608A, 610A, 612A) has changed to a position where they can be better seen by the first user's virtual camera 606. While the first user will perceive that the at least one other user's avatar (i.e., perceived avatar 608B, 610B, 612B) has changed positions, the other user's actual avatar (i.e., avatars 608A, 610A, 612A) and virtual camera will maintain position and perspective according to control of the other user. The first user may have provided an input that has activated a transition from the configuration illustrated in diagram 600 to the configuration illustrated in diagram 640. For example, a first user can enter a key combination on a keyboard to activate the transition. In another example, a first user navigates their avatar and virtual camera into virtual environment 602 or towards a virtual object to activate the transition.

After the transition has been activated, several changes can occur from the perspective of the first virtual camera 606 of the first user. A new location can be determined for each of the other users' avatars relative to the first user's avatar 604 and virtual camera 606. In these new locations, a corresponding perceived avatar can be resituated. For example, three new locations can be determined for the second, third, and fourth users. The new location can be within area of space 614. Area of space 614 can be a sector of a circle, or an arc, formed in relation to a center point of virtual environment 602. Area of space 614 can be an area of space opposite first avatar 604. Area of space 614 can be about the central point of virtual environment 602, opposite first avatar 604. Area of space 614 can be calculated based on a size of the users' avatars (e.g., avatars 604, 608A, 610A, 612A or perceived avatars 608B, 610B, 612B), a size of the users' web browsers, or a size of virtual environment 602 (e.g., a distance between virtual walls or diameter).

Area of space 614 may be determined such that it is within the field of view of virtual camera 606. In addition, area of space 614 may be determined so that it is distant enough from virtual camera 606 to include all the avatars in the area without overlapping one another. Once area of space 614 is determined, new locations for the avatars are determined within area of space 614 (illustrated as perceived avatars 608B, 610B, 612B). The new locations may be determined such that they are substantially equidistant within area of space 614 and with respect to the first virtual camera 606.

In some aspects, first virtual camera 606 may be repositioned so that the perspective of the first user faces a central point in virtual environment 602. This allows the central point of virtual environment 602 to be used as a reference point when selecting new locations. For example, a new location can be determined for the second user opposite first virtual camera 606 around the central point.

Depending on the size of virtual environment 602, the number of users interacting in virtual environment 602, the size of avatars (e.g., avatars 604, 608A, 610A, 612A or perceived avatars 608B, 610B, 612B), and an amount of available space in virtual environment 602, the new location or area of space 614 may also include an area of vertical space where perceived avatars can be stacked vertically from the perception of the first user. In this way, area of space 614 may be a three-dimensional area and the perceived avatars can be distributed within the three-dimensional area such that none overlap with one another from the perspective of virtual camera 606. For example, if a size of a perceived avatar is larger than a size of available space at the new location, the perceived avatar can be stacked vertically at the new location.

With new locations determined, perceived avatars corresponding to the other user's avatars can be resituated to the new locations or the area of space 614. For example, perceived avatar 608B corresponding to second user's avatar 608A can be resituated to its new location in area of space 614; perceived avatar 610B corresponding to third user's avatar 610A can be resituated to its new location in area of space 614; and perceived avatar 612B corresponding to fourth user's avatar 612A can be resituated to its new location in area of space 614. When they are resituated, the perceived avatars may be oriented to face virtual camera 606. In some aspects, the perceived avatars 608B, 610B, and 612B can be resituated in accordance with a clockwise ordering of avatars 608A, 610A, and 612A found prior to the transition and with respect to first virtual camera 606, such as that illustrated in diagram 600.

The perceived avatars 608B, 610B, and 612B only exist from the perspective of the first user's virtual camera 606, but are not visible from other user's virtual cameras. This allows the first user to easily see the other user avatars within the perspective of virtual camera 606. But the second user is still perceiving virtual environment 602 from virtual camera 616, the third user is still perceiving virtual environment 602 from virtual camera 618, and the fourth user is still perceiving virtual environment 602 from virtual camera 620. Additionally, the second, third, and fourth users are still able to control their virtual cameras and navigate virtual environment 602 through avatars 608A, 610A, and 612A.

The perceived avatars can be created by marking avatars 608A, 610A, and 612A as first objects, creating second objects (i.e., perceived avatars 608B, 610B, and 612B) and placing them at the new locations, and copying the audio and visual information from the first objects onto the second objects, where avatars 608A, 610A, and 612A remain controllable and navigable by the second, third, and fourth users. Alternatively, the perceived avatars can be created by disconnecting transmission of network properties to the first user's device, where the first user's device does not render the location of avatars 608A, 610A, and 612A and instead renders their location as perceived avatars 608B, 610B, and 612B.

In some aspects, the transition from the configuration illustrated in diagram 600 to the configuration illustrated in diagram 640 (i.e., the positioning of the first user, selecting of a location, and resituating of the second user) includes animations of the transition. For example, as the first user activates the transition and/or as the first user's avatar 604 is positioned towards a central point of virtual environment 602, the first user may perceive avatars 608A, 610A, and 612A as having moved to resituated positions through virtual camera 606.

In some aspects, the above described principles of determining a new location, creating a perceived version, and resituating the perceived version to the new location can be applied to entities other than a user's avatar. For example, viewing screens or objects (e.g., object 514) within virtual environment 602 can be resituated in accordance with the above described principles.

The first user may perceive the second, third, and fourth user's virtual presence as perceived avatars 608B, 610B, and 612B until the transition is disabled or until one of the users leaves virtual environment 602. If the transition is disabled, then virtual environment 602 can transition from the configuration illustrated in diagram 640 to the configuration illustrated in diagram 600. If the first user leaves virtual environment 602, virtual environment 602 can transition from the configuration illustrated in diagram 640 to the configuration illustrated in diagram 600. If the second, third, or fourth users leave virtual environment 602, the corresponding perceived avatar can exit diagram 640 from the perspective of virtual camera 606, or virtual environment 602 can transition from the configuration illustrated in diagram 640 to the configuration illustrated in diagram 600. Upon transitioning from the configuration illustrated in diagram 640 to the configuration illustrated in diagram 600, the first user can perceive, through virtual camera 606, the other users' avatars as existing in positions corresponding to avatars 608A, 610A, and 612A, rather than perceived avatars 608B, 610B, and 612B. If a user leaves virtual environment 602, if a user rearranges themselves through movement of their avatar and virtual camera, or if a new user joins virtual environment 602, virtual environment 602 can transition from the configuration illustrated in diagram 640 to the configuration illustrated in diagram 600. Alternatively, a further resituating process can occur.

Figure 7:
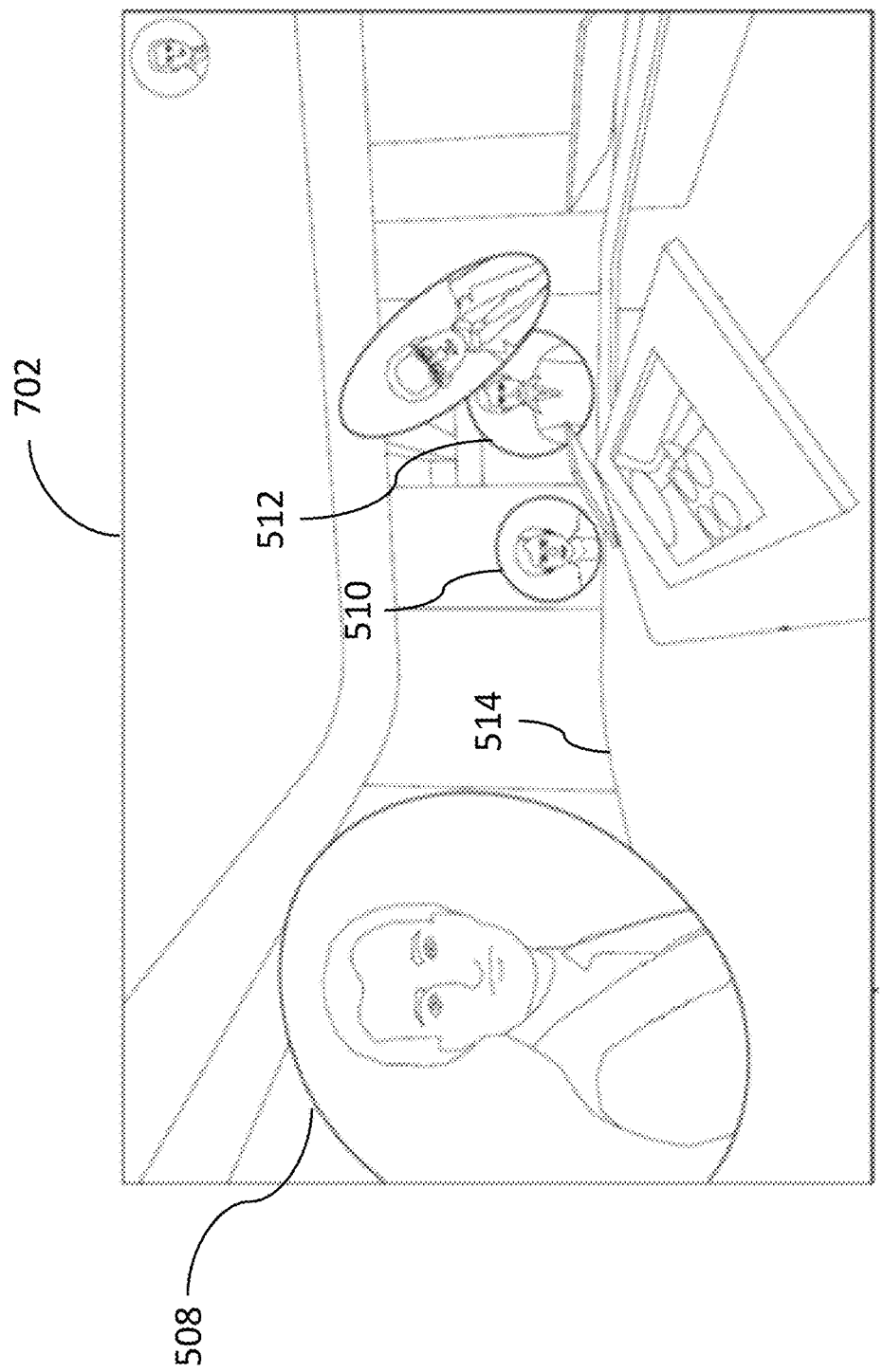
FIG. 7 is a diagram illustrating an example interface when resituating virtual cameras and avatars in a virtual environment.

FIG. 7 is a diagram 700 illustrating an example interface when resituating virtual cameras and avatars in a virtual environment 702. Diagram 700 can correspond to diagram 540, where a transition has occurred and the avatar and virtual camera of at least one other user has been resituated. Diagram 700 can include second avatar 508, third avatar 510, and fourth avatar 512. Diagram 700 also can include object 514 positioned in virtual environment 702 around a central point. Diagram 700 illustrates a perspective from virtual camera 506 of the first user. In other words, the first user is able to view avatar 508, avatar 510, and avatar 512 of the second, third, and fourth users, resituated around object 514.

Figure 8A:
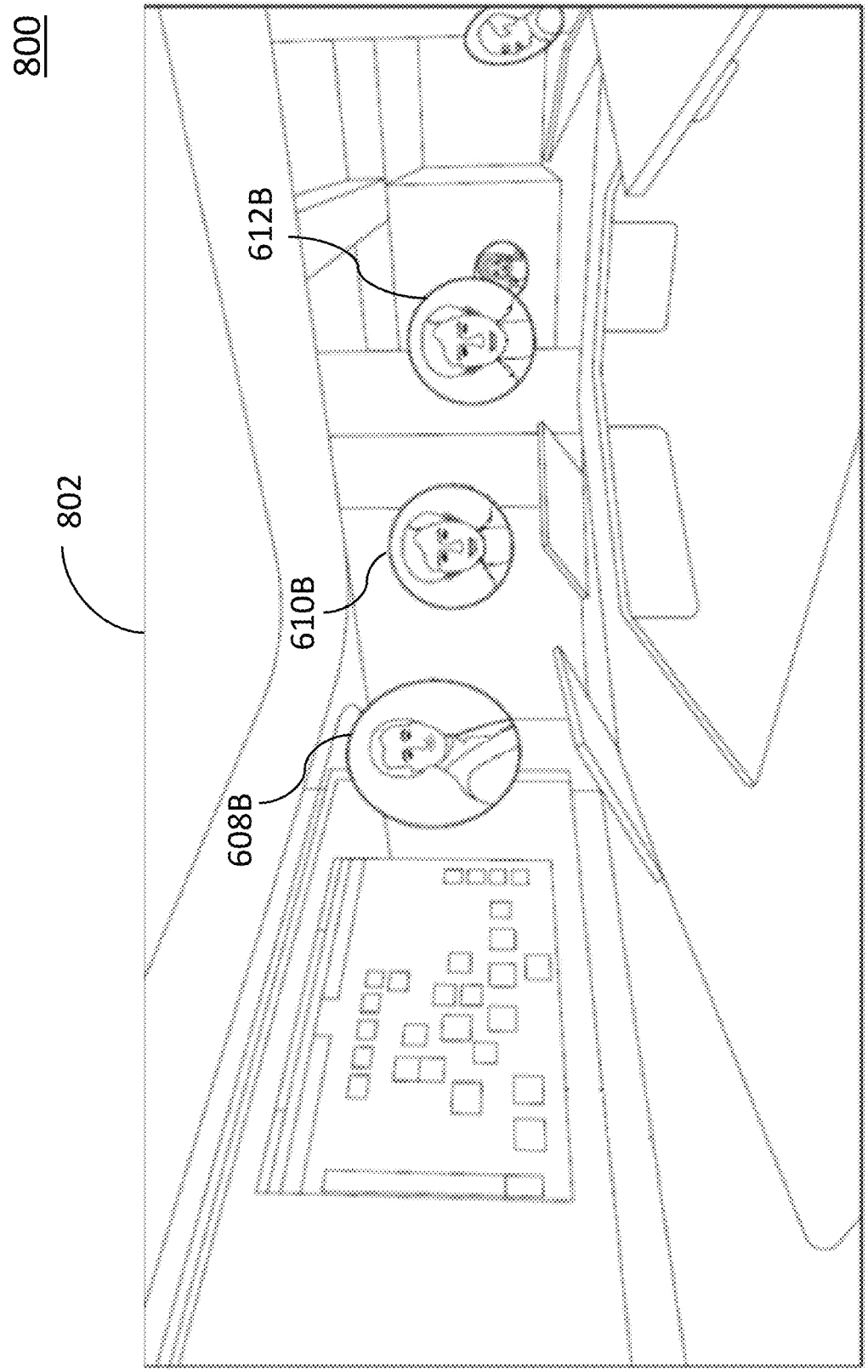
FIGS. 8A-8B are diagrams illustrating an example interface when resituating avatars in a virtual environment, without resituating corresponding virtual cameras.
Figure 8B:
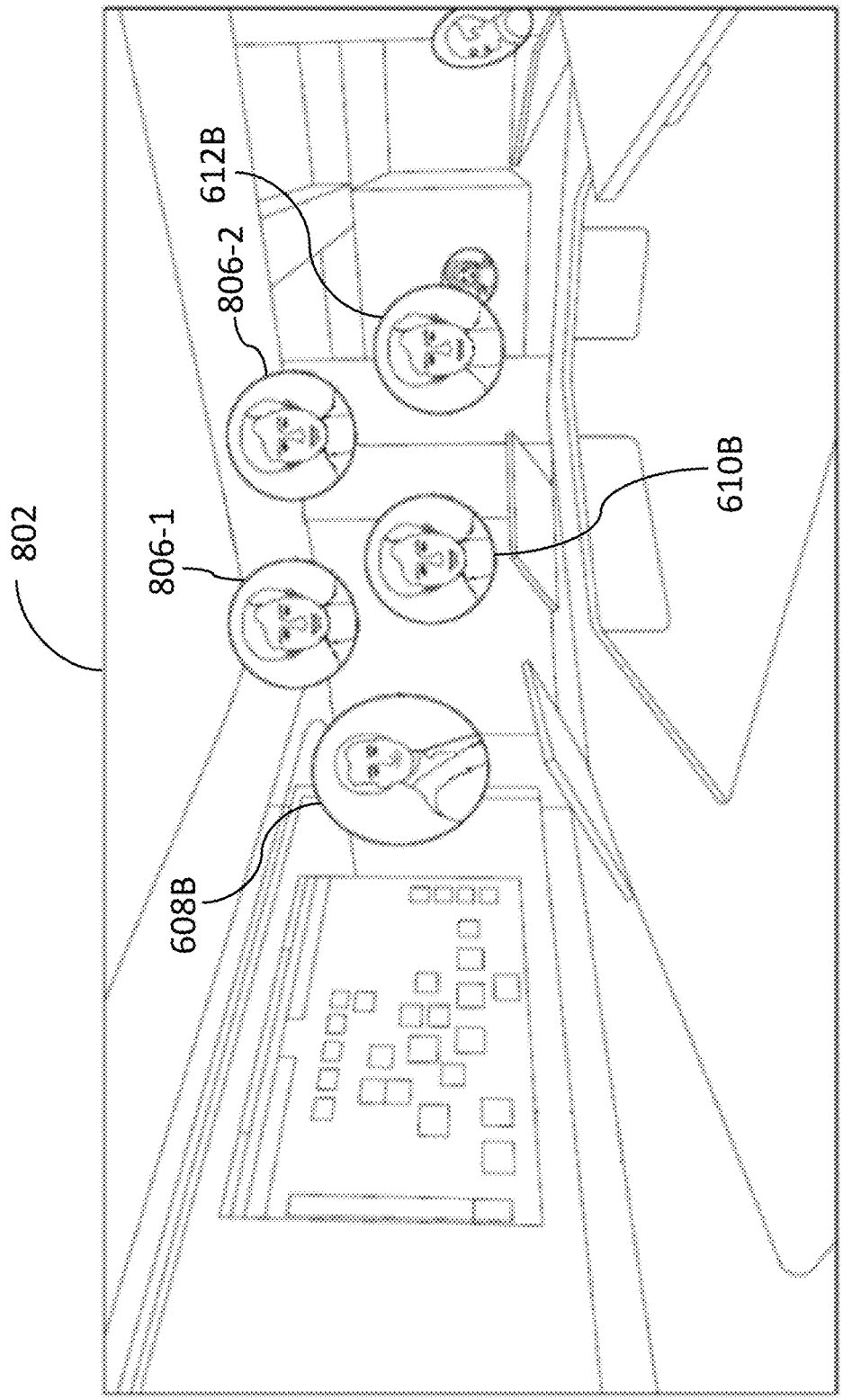

FIGS. 8A-8B are diagrams illustrating an example interface when resituating avatars in a virtual environment, without resituating corresponding virtual cameras. FIG. 8A is a diagram 800 illustrating an example interface when resituating avatars in a virtual environment 802, where there is sufficient space for all perceived avatars. Diagram 800 can correspond to diagram 640, where a transition has occurred and perceived avatars of at least one other user have been resituated. Diagram 800 can include perceived second avatar 608B, perceived third avatar 610B, and perceived fourth avatar 612B positioned in virtual environment 802. Diagram 800 illustrates a perspective from virtual camera 606 of the first user. In other words, the first user is able to view perceived avatars 608B, 610B, and 612B as if they are positioned around the first user's avatar 604 (or around a central point of virtual environment 802), even though the second, third, and fourth users are interacting with virtual environment 802 through avatars 608A, 610A, and 612B and virtual cameras 616, 618, and 620.

FIG. 8B is a diagram 820 illustrating an example interface when resituating avatars in a virtual environment 802, where there is insufficient space for all perceived avatars and some perceived avatars are stacked vertically. Diagram 820 can generally correspond to diagram 640, where a transition has occurred and perceived avatars of at least one other user have been resituated. Diagram 820 can include perceived second avatar 608B, perceived third avatar 610B, and perceived fourth avatar 612B. Diagram 820 can also include one or more other perceived avatars, such as perceived avatar 806-1 and perceived avatar 806-2. Diagram 820 illustrates a perspective from virtual camera 606 of the first user.

In FIG. 8B, the number of users interacting with virtual environment 802 has exceeded the amount of available space in an area of space and some perceived avatars have been stacked vertically from the perception of the first user. In an example aspect, perceived avatars 608B, 610B, and 612B have occupied the available space in an area of space in virtual environment 802. Therefore, additional users' perceived avatars 806-1 and 806-2 have been stacked vertically from the perception of the first user.

Figure 9:
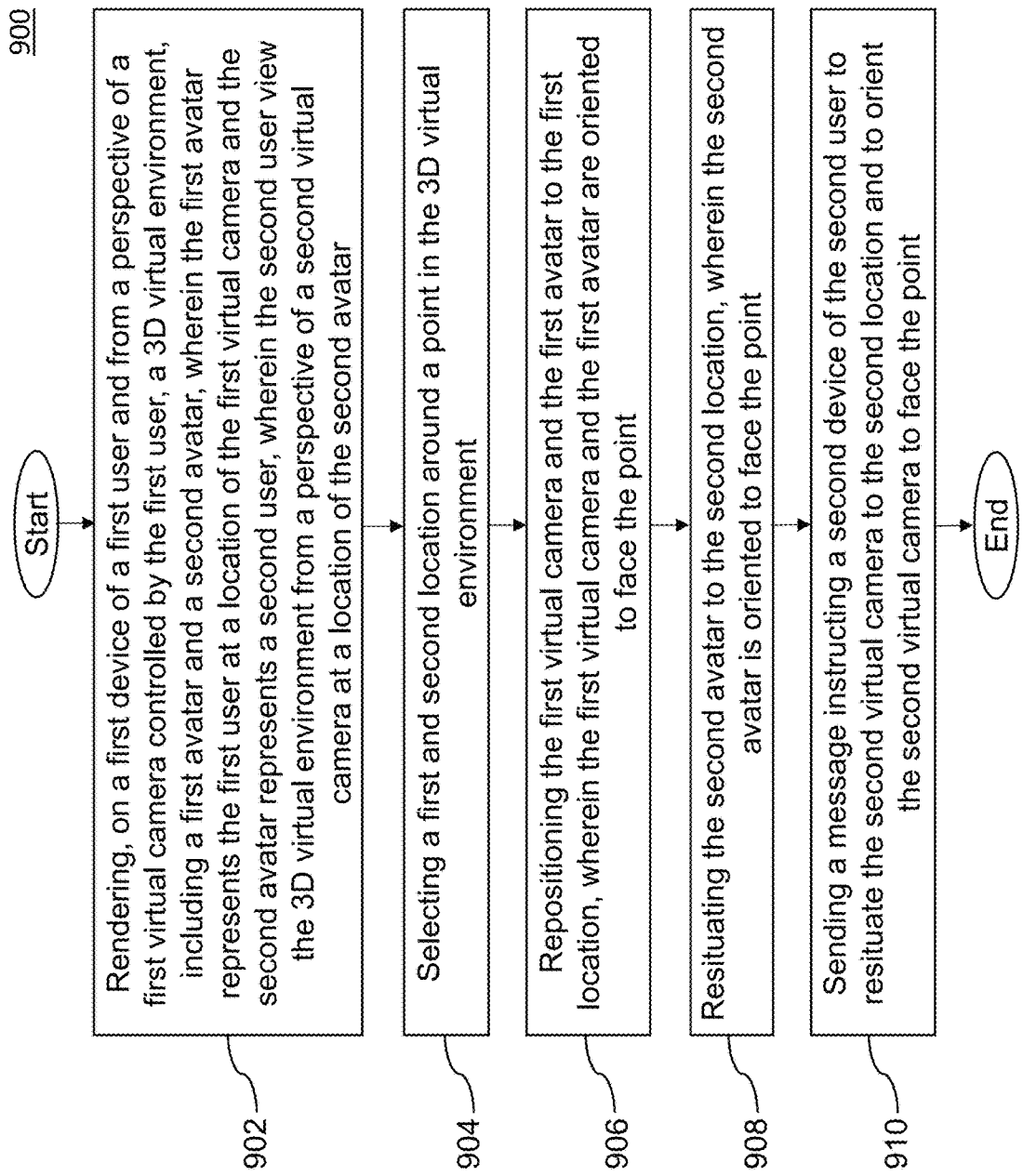
FIG. 9 is a flowchart illustrating a method for resituating virtual cameras and avatars in a virtual environment.

FIG. 9 is a flowchart for a method 900 for resituating virtual cameras and avatars in a virtual environment, according to an aspect of the invention. It is to be appreciated that not all steps may be needed to perform the disclosure provided herein. Further, some of the steps can be performed simultaneously, or in a different order than shown in FIG. 9, as would be understood by a person of ordinary skill in the art.

Method 900 can be implemented by system 300 and operations caused by computer system 1200. Method 900 can be further understood with reference to FIGS. 5A-5B. However, method 900 is not limited to these example aspects.

In 902, a 3D virtual environment is rendered. The 3D virtual environment is rendered on a first device of a first user and is viewable from a perspective of a first virtual camera. The first virtual camera is controllable by the first user. The 3D virtual environment includes a first avatar and a second avatar. The first avatar is a virtual representation of the first user at a location of the first virtual camera. Similarly, the second avatar is a virtual representation of a second user. And the second user views the 3D virtual environment from a perspective of a second virtual camera that is at a location of the second avatar.

In some aspects, the users can control or navigate the location and direction of their avatars and virtual cameras. Each user can view, through their virtual camera, a perspective of the avatar of the other user (i.e., viewing the other user's avatar, which can include a texture mapped video of the other user as described with reference to interface 100). Likewise, each user can hear sounds from the other user. From the perspective of any one of the user's virtual cameras, the avatars can exist in a certain clockwise ordering within the 3D virtual environment.

The first user may desire to assemble the second user (e.g., the second user's avatar, whereby the second user's virtual camera can move with the avatar) around a point or object in the 3D virtual environment to enable better interaction between the users. In some aspects, the 3D virtual environment can include one or more other users, such as a third user. For example, the third user can have a third avatar and can view the 3D virtual environment through a perspective of a third virtual camera. The below operations can apply to all users participating in the 3D virtual environment.

In 904, a first and second location are selected. The first and second locations are selected around a point in the three-dimensional virtual environment. The first and second locations can also be selected around an object in the three-dimensional virtual environment. To trigger the selection, the first user can provide a certain input. For example, the first user can enter a key combination on a keyboard to activate the transition. In another example, the first user navigates their avatar and virtual camera into the three-dimensional virtual environment or towards an object as the input. In another aspect, the other users can be required to consent to the transition. For example, each user can be assigned a location around the point or object and can receive a prompt on their device display, asking for consent to resituate their avatar and/or virtual camera to the assigned location around the point or object.

The point in the three-dimensional virtual environment can be a central point or a point located elsewhere. The location of the point can be determined by two ([x, y] coordinates) or three-dimensional parameters ([x, y, z] coordinates). For example, the point can be located at the origin of the three-dimensional virtual environment, having three-dimensional parameters of [0, 0, 0]. The object can be a visible or invisible object. In visible form, the object can be a virtual table, a virtual chair, a virtual desk, or any other virtual object visible through a user's virtual camera as would be appreciated by a person of ordinary skill in the art. In invisible form, the object can be a computed point, a computed shape, or any other computed object not visible through a user's virtual camera as would be appreciated by a person of ordinary skill in the art. The object can exist at the center of the 3D virtual environment.

The locations can be determined within an area of space surrounding the point or the object. The area of space can be considered a spacing natural to users in a real-world environment. For example, the object can be a table and the area of space can be an area surrounding the table where users would normally sit in a chair. Specifically, the area of space can be calculated based on a size of the object (e.g., a diameter), a size of the users' avatars, a distance between the object and the avatars, a size of the users' web browsers, and/or a size of the 3D virtual environment (e.g., a distance between virtual walls). The distance between the object and the avatars can be predetermined or dynamically calculated using the other possible inputs. If there are two users, the locations for each can be positioned opposite one another around the point or object. If there are more than two users, the locations for each can be positioned substantially equidistant from one another around the point or object. In an example, the locations may be determined by conference application 310A on a device 306A.

In 906, the first virtual camera and the first avatar are repositioned to the first location. The first virtual camera and the first avatar are oriented to face the point. The first virtual camera and the first avatar can also be oriented to face the object. For example, the first user's virtual camera can be facing the central point of the object (i.e., towards the center of the 3D virtual environment).

In 908, the second avatar is resituated to the second location. Similar to 906, the second avatar is oriented to face the point or the object. The second avatar can be resituated to the second location within the area of space. In aspects with more than two users, the additional avatars can also be resituated to the locations around the point or object, and oriented to face the point or the object. From the perspective of the first user's virtual camera, the other users' avatars can be resituated in accordance with a clockwise ordering found prior to 904. Additionally from the perspective of first user's virtual camera, through the first device, the first user may view all user avatars now situated around the point or object and within the view of their virtual camera.

In 910, a message is sent instructing a second device of the second user to resituate the second virtual camera to the second location and to orient the second virtual camera to face the point or object. In aspects with more than two users, additional messages with instructions can be sent to the user devices to resituate the additional virtual cameras to the additional locations and to orient the additional virtual cameras to face the point or object. In this way, the perspectives of the other users' virtual cameras are corrected to face the user avatars in the 3D virtual environment.

In some aspects, the transition from 902 to 910 can include avatar animations. For example, every instance where an avatar is repositioned or resituated, the other users may view, through their virtual camera, an animation of the movement of the avatar.

FIG. 10 is a flowchart for a method 1000 for resituating avatars in a virtual environment, without resituating corresponding virtual cameras, according to an aspect of the invention. It is to be appreciated that not all steps may be needed to perform the disclosure provided herein. Further, some of the steps can be performed simultaneously, or in a different order than shown in FIG. 10, as would be understood by a person of ordinary skill in the art.

Method 1000 can be implemented by system 300 and operations caused by computer system 1200. Method 1000 can be further understood with reference to FIGS. 6A-6B. However, method 1000 is not limited to these example aspects.

In 1002, a 3D virtual environment is rendered. The 3D virtual environment is rendered on a first device of a first user and is viewable from a perspective of a first virtual camera. The first virtual camera is controllable by the first user. The 3D virtual environment includes a first avatar and a second avatar. The 3D virtual environment can also include a virtual object, such as a virtual table, a virtual chair, a virtual desk, or any other virtual object as would be appreciated by a person of ordinary skill in the art. The first avatar is a virtual representation of the first user at a location of the first virtual camera. Similarly, the second avatar is a virtual representation of a second user. And the second user views the 3D virtual environment from a perspective of a second virtual camera that is at a location of the second avatar.

In some aspects, the users can control or navigate the location and direction of their avatars and virtual cameras. Each user can view, through their virtual camera, a perspective of the avatar of the other user (i.e., viewing the other user's avatar, which can include a texture mapped video of the other user as described with reference to interface 100). Likewise, each user can hear sounds from the other user. From the perspective of any one of the user's virtual cameras, the avatars can exist in a certain clockwise ordering within the 3D virtual environment.

The first user may desire to move the second user (e.g., the other user's avatar) to a new location in the 3D virtual environment to enable better interaction between the users. However, the first user may desire to change their own perception of the second user's avatar without altering the second user's perspective. In other words, the first user may desire to only perceive that the second user's avatar has changed positions. In some aspects, the 3D virtual environment can include one or more other users, such as a third user. For example, the third user can have a third avatar and can view the 3D virtual environment through a perspective of a third virtual camera. The below operations can apply to all users participating in the 3D virtual environment.

In 1004, two steps take place from the perspective of the first virtual camera. First, a new location is determined for a perceived avatar, relative to the first avatar. The perceived avatar corresponds to the second avatar. And second, the perceived avatar is resituated to the new location. When the perceived avatar is resituated, the second virtual camera is maintained for the second user. In aspects with more than two users, additional new locations can be determined for additional perceived avatars, where the additional virtual cameras are maintained for the users when the perceived avatars are resituated to the new locations.

The first user may have provided an input that has triggered the two steps. For example, the first user can enter a key combination on a keyboard to activate the transition. In another example, the first user can navigate their avatar and virtual camera into the three-dimensional virtual environment or towards a virtual object to activate the transition.

The new location can be within an area of space. The area of space can be a sector of a circle, or an arc, formed in relation to a center point of the 3D virtual environment. The area of space can be an area of space opposite the first avatar. The area of space can be calculated based on a size of the users' avatars, a size of the users' web browsers, or a size of the 3D virtual environment (e.g., a distance between virtual walls or diameter). The area of space may be determined such that it is within the field of view of the first user's virtual camera. The new location or the area of space may also include an area of vertical space where perceived avatars can be stacked vertically from the perception of the first user. For aspects with more than two users, the new locations may be determined such that they are substantially equidistant within the area of space and with respect to the first virtual camera. In some aspects, the first virtual camera may be repositioned so that the perspective of the first user faces a central point in the 3D virtual environment. This allows the central point of the 3D virtual environment to be used as a reference point when selecting new locations.

With new locations determined, the perceived avatar corresponding to the second user's avatar can be resituated to its new location. The perceived avatar only exists from the perspective of the first user's virtual camera, but is not visible from other user's virtual cameras. This allows the first user to easily see the other user avatars within the perspective of the virtual camera. When the perceived avatar is resituated, it may be oriented to face the first user's virtual camera. The perceived avatar can be resituated in accordance with a clockwise ordering of the avatars in 1002 and with respect to the first virtual camera.

Figure 11:
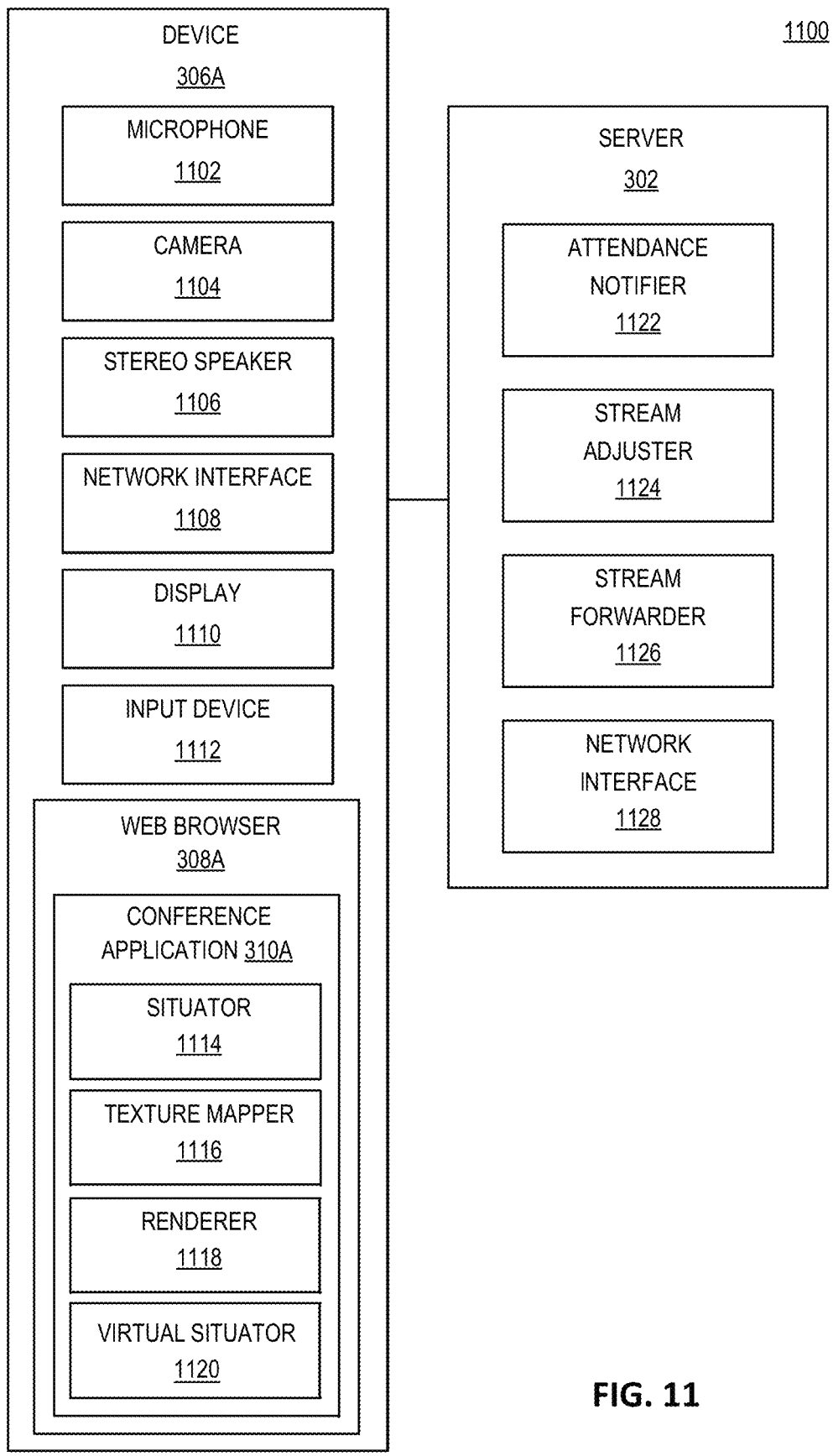
FIG. 11 is a diagram illustrating components of devices used to provide videoconferencing within a virtual environment.

Device Components and Computer Systems for Videoconferencing in a Virtual Environment FIG. 11 is a diagram of a system 1100 illustrating components of devices used to provide videoconferencing within a virtual environment. In various aspects, system 1100 can operate according to the methods described above.

Device 306A is a user computing device. Device 306A could be a desktop or laptop computer, smartphone, tablet, or wearable device (e.g., watch or head mounted device). Device 306A includes a microphone 1102, camera 1104, stereo speaker 1106, and input device 1112. Not shown, device 306A also includes a processor and persistent, non-transitory and volatile memory. The processors can include one or more central processing units, graphic processing units or any combination thereof.

Microphone 1102 converts sound into an electrical signal. Microphone 1102 is positioned to capture speech of a user of device 306A. In different examples, microphone 1102 could be a condenser microphone, electret microphone, moving-coil microphone, ribbon microphone, carbon microphone, piezo microphone, fiber-optic microphone, laser microphone, water microphone, or MEMs microphone.

Camera 1104 captures image data by capturing light, generally through one or more lenses. Camera 1104 is positioned to capture photographic images of a user of device 306A. Camera 1104 includes an image sensor (not shown). The image sensor may, for example, be a charge coupled device (CCD) sensor or a complementary metal oxide semiconductor (CMOS) sensor. The image sensor may include one or more photodetectors that detect light and convert it to electrical signals. These electrical signals captured together in a similar timeframe comprise a still photographic image. A sequence of still photographic images captured at regular intervals together comprise a video. In this way, camera 1104 captures images and videos.

Stereo speaker 1106 is a device which converts an electrical audio signal into a corresponding left-right sound. Stereo speaker 1106 outputs the left audio stream and the right audio stream generated by an audio processor to be played to device 306A's user. Stereo speaker 1106 includes both ambient speakers and headphones that are designed to play sound directly into a user's left and right ears. Example speakers includes moving-iron loudspeakers, piezoelectric speakers, magnetostatic loudspeakers, electrostatic loudspeakers, ribbon and planar magnetic loudspeakers, bending wave loudspeakers, flat panel loudspeakers, heil air motion transducers, transparent ionic conduction speakers, plasma arc speakers, thermoacoustic speakers, rotary woofers, moving-coil, electrostatic, electret, planar magnetic, and balanced armature.

Network interface 1108 is a software or hardware interface between two pieces of equipment or protocol layers in a computer network. Network interface 1108 receives a video stream from server 302 for respective participants for the meeting. The video stream is captured from a camera on a device of another participant to the video conference. Network interface 1108 also receives data specifying a three-dimensional virtual space and any models therein from server 302. For each of the other participants, network interface 1108 receives a position and direction in the three-dimensional virtual space. The position and direction are input by each of the respective other participants.

Network interface 1108 also transmits data to server 302. It transmits the position of device 306A's user's virtual camera used by renderer 1118 and it transmits video and audio streams from camera 1104 and microphone 1102.

Display 1110 is an output device for presentation of electronic information in visual or tactile form (the latter used for example in tactile electronic displays for blind people). Display 1110 could be a television set, computer monitor, head-mounted display, heads-up displays, output of a augmented reality or virtual reality headset, broadcast reference monitor, medical monitors mobile displays (for mobile devices), or Smartphone displays (for smartphones). To present the information, display 1110 may include an electroluminescent (ELD) display, liquid crystal display (LCD), light-emitting diode (LED) backlit LCD, thin-film transistor (TFT) LCD, light-emitting diode (LED) display, organic light-emitting diode (OLED) display, active-matrix organic light-emitting diode (AMOLED) display, plasma (PDP) display, or quantum dot (QLED) display.

Input device 1112 is a piece of equipment used to provide data and control signals to an information processing system such as a computer or information appliance. Input device 1112 allows a user to input a new desired position of a virtual camera used by renderer 1118, thereby enabling navigation in the three-dimensional environment. Examples of input devices include keyboards, mouse, scanners, joysticks, and touchscreens.

Web browser 308A and conference application 310A were described above with respect to FIG. 3. Conference application 310A includes situator 1114, texture mapper 1116, renderer 1118, and virtual situator 1120.

Situator 1114 selects locations within a virtual environment, repositions and resituates avatars and virtual cameras to the selected locations within the virtual environment, and sends instructions to various user devices (e.g., 306A). Situator 1114 allows a user, through display 1110, to better interact with other users by arranging the other users' avatars around a virtual object rendered by renderer 1118 within the virtual environment. Situator 1114 also communications with other user devices so that the other users' perspectives, through their virtual cameras, are adjusted similarly.

Texture mapper 1116 texture maps the video stream onto a three-dimensional model corresponding to an avatar. Texture mapper 1116 may texture map respective frames from the video to the avatar. In addition, texture mapper 1116 may texture map a presentation stream to a three-dimensional model of a presentation screen.

Renderer 1118 renders, from a perspective of a virtual camera of the user of device 306A, for output to display 1110 the three-dimensional virtual space including the texture-mapped three-dimensional models of the avatars for respective participants located at the received, corresponding position and oriented in the direction. Renderer 1118 also renders any other three-dimensional models including for example the presentation screen.

Virtual situator 1120 determines new locations for perceived representations of user avatars (e.g., perceived avatars) and resituates the perceived avatars to the new locations. Virtual situator 1120 allows a user, through display 1110, to better interact with other users by arranging the other users' perceived avatars within the user's field of view.

Server 302 includes an attendance notifier 1122, a stream adjuster 1124, and a stream forwarder 1126.

Attendance notifier 1122 notifies conference participants when participants join and leave the meeting. When a new participant joins the meeting, attendance notifier 1122 sends a message to the devices of the other participants to the conference indicating that a new participant has joined. Attendance notifier 1122 signals stream forwarder 1126 to start forwarding video, audio, and position/direction information to the other participants.

Stream adjuster 1124 receives a video stream captured from a camera on a device of a first user. Stream adjuster 1124 determines an available bandwidth to transmit data for the virtual conference to the second user. It determines a distance between a first user and a second user in a virtual conference space. And, it apportions the available bandwidth between the first video stream and the second video stream based on the relative distance. In this way, stream adjuster 1124 prioritizes video streams of closer users over video streams from farther ones. Additionally or alternatively, stream adjuster 1124 may be located on device 306A, perhaps as part of conference application 310A.

Stream forwarder 1126 broadcasts position/direction information, video, audio, and screen share screens received (with adjustments made by stream adjuster 1124). Stream forwarder 1126 may send information to the device 306A in response to a request from conference application 310A. Conference application 310A may send that request in response to the notification from attendance notifier 1122.

Network interface 1128 is a software or hardware interface between two pieces of equipment or protocol layers in a computer network. Network interface 1128 transmits the model information to devices of the various participants. Network interface 1128 receives video, audio, and screen share screens from the various participants.

Situator 1114, texture mapper 1116, renderer 1118, virtual situator 1120, attendance notifier 1122, stream adjuster 1124, and stream forwarder 1126 can each be implemented in hardware, software, firmware, or any combination thereof System 1100 can also include a screen capturer, configured to capture a presentation stream, and an audio processor, configured to adjust volume of the received audio stream.

Figure 12:
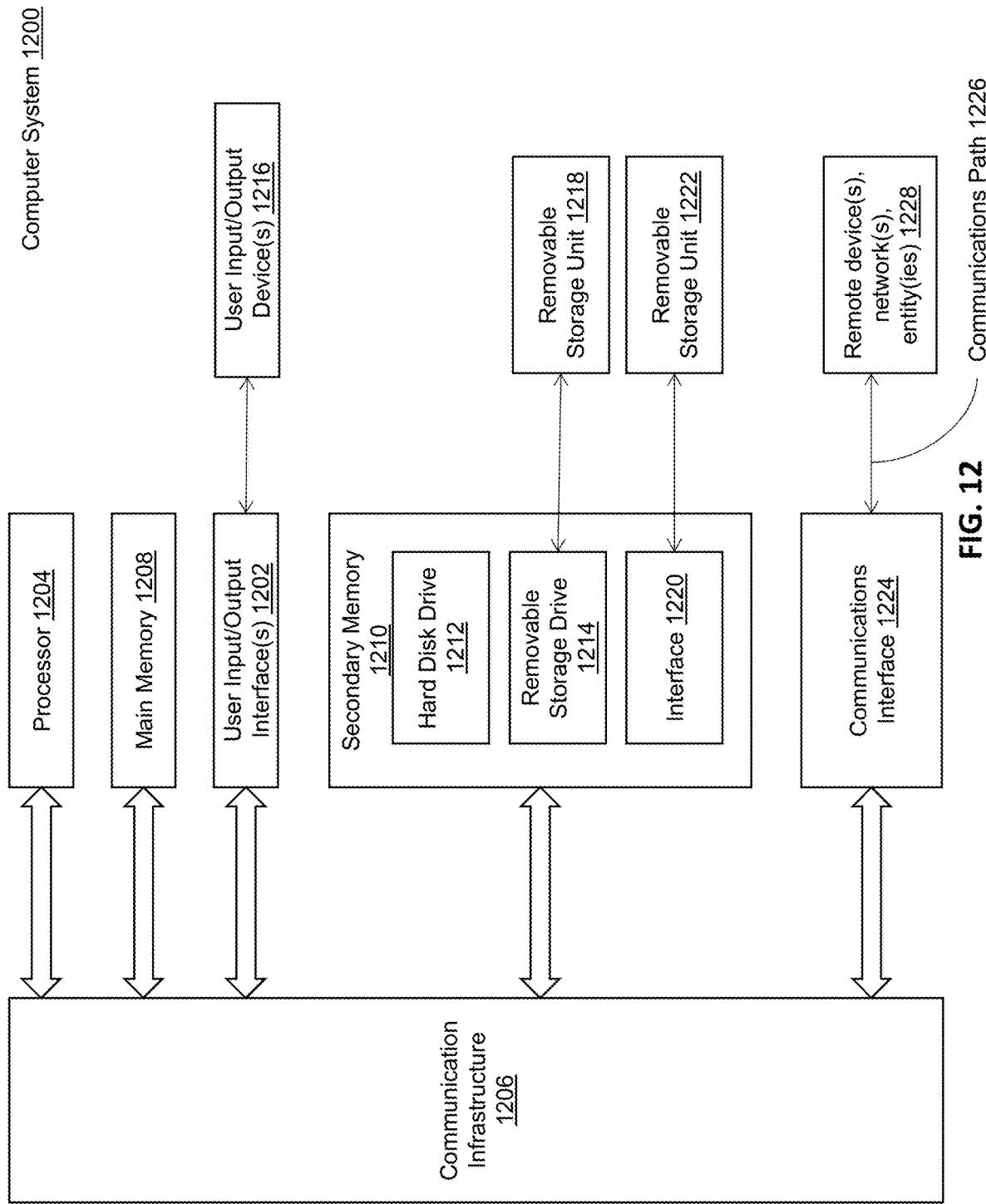
FIG. 12 is a block diagram of an example computer system useful for implementing various aspects.

Various aspects can be implemented, for example, using one or more computer systems, such as computer system 1200 shown in FIG. 12. Computer system 1200 can be used, for example, to implement a system for resituating virtual cameras and avatars in a virtual environment. For example, computer system 1200 can render a three-dimensional virtual environment, position and resituate virtual cameras, and generate and resituate perceived avatars corresponding to user avatars. Computer system 1200 can be any computer capable of performing the functions described herein.

Computer system 1200 can be any well-known computer capable of performing the functions described herein.

Computer system 1200 includes one or more processors (also called central processing units, or CPUs), such as a processor 1204. Processor 1204 is connected to a communication infrastructure or bus 1206.

One or more processors 1204 may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1216, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, a tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/or any other computer data storage device. Removable storage drive 1214 reads from and/or writes to removable storage unit 1218 in a well-known manner.

According to an exemplary aspect, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it would be apparent to persons skilled in the relevant art(s) how to make and use aspects of this disclosure using data processing devices, computer systems and/or computer architectures other than that shown in FIG. 12. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary aspects, but should be defined only in accordance with the following claims and their equivalents.

What is claimed is:

1. A computer implemented method for resituating virtual cameras and avatars in a three-dimensional (3D) virtual environment, comprising:
    (a) rendering, on a first device of a first user and from a perspective of a first virtual camera controlled by the first user, the 3D virtual environment, including a first avatar and a second avatar, wherein the first avatar represents the first user at a location of the first virtual camera and the second avatar represents a second user, wherein the second user views the 3D virtual environment from a perspective of a second virtual camera at a location of the second avatar;
    initiating a transition to a temporary configuration enabling interaction between the first user and the second user, comprising:
    (b) selecting a first and second location around a point in the 3D virtual environment;
    (c) repositioning the first virtual camera and the first avatar to the first location, wherein the first virtual camera and the first avatar are oriented to face the point as a result of the repositioning;
    (d) resituating the second avatar to the second location, wherein the second avatar is oriented to face the point as a result of the resituating;
    (e) sending a message instructing a second device of the second user to resituate the second virtual camera to the second location and to orient the second virtual camera to face the point; and
    (f) when the temporary configuration is disabled, returning the first virtual camera, the first avatar, the second avatar, and the second virtual camera to respective original positions.

2. The computer implemented method of claim 1, wherein the 3D virtual environment includes a third avatar representing a third user, wherein the third user views the 3D virtual environment from a perspective of a third virtual camera at a location of the third avatar and the 3D virtual environment includes the first and second avatars at the respective first and second locations, and the method further comprises:
    initiating a transition to a temporary configuration enabling interaction between the first user, the second user, and the third user, comprising:
    selecting a third location around the point;
    resituating the third avatar to the third location, wherein the third avatar is oriented to face the point;
    sending a second message instructing a third device of the third user to resituate the third virtual camera to the third location and to orient the third virtual camera to face the point; and
    when the temporary configuration is disabled, returning the third avatar and the third virtual camera to respective original positions.

3. The computer implemented method of claim 2, wherein the first virtual camera, second avatar, and third avatar exist in the 3D virtual environment in an ordering, wherein the ordering is maintained when repositioning the first virtual camera and resituating the second and third avatars.

4. The computer implemented method of claim 1, wherein steps (b)-(e) occur upon activation by the first user.

5. The computer implemented method of claim 1, wherein the second user is prompted to provide consent prior to resituating the second avatar and the second virtual camera to the second location.

6. The computer implemented method of claim 1, further comprising:
    determining an area of space surrounding the point such that the area of space appears as a natural spacing to users as if in a real-world environment,
    wherein the selecting comprises selecting the first and second location from within the area of space.

7. The computer implemented method of claim 6, wherein the selecting further comprises spacing the first and second locations substantially equidistant within the area of space.

8. The computer implemented method of claim 1, wherein repositioning comprises animating movement of the first avatar to the first location around the point, and resituating comprises animating movement of the second avatar to the second location around the point.

9. The computer implemented method of claim 1, wherein the first and second locations are based on a size of an object, a size of the first avatar, a size of the second avatar, a distance between an object and the first and second avatars, a size of a user's web browser, or a size of the 3D virtual environment.

10. The computer implemented method of claim 1, wherein the first and second avatars each comprise a model having texture mapped video captured of the respective first and second users.

11. A non-transitory computer-readable medium having instructions stored thereon that, when executed by at least one computing device, cause the at least one computing device to perform operations comprising:
    (a) rendering, on a first device of a first user and from a perspective of a first virtual camera controlled by the first user, the 3D virtual environment, including a first avatar and a second avatar, wherein the first avatar represents the first user at a location of the first virtual camera and the second avatar represents a second user, wherein the second user views the 3D virtual environment from a perspective of a second virtual camera at a location of the second avatar;

initiating a transition to a temporary configuration enabling interaction between the first user and the second user, comprising:
  (b) selecting a first and second location around a point in the 3D virtual environment;
  (c) repositioning the first virtual camera and the first avatar to the first location, wherein the first virtual camera and the first avatar are oriented to face the point as a result of the repositioning;
  (d) resituating the second avatar to the second location, wherein the second avatar is oriented to face the point as a result of the resituating;
  (e) sending a message instructing a second device of the second user to resituate the second virtual camera to the second location and to orient the second virtual camera to face the point; and
  (f) when the temporary configuration is disabled, returning the first virtual camera, the first avatar, the second avatar, and the second virtual camera to respective original positions.

12. The non-transitory computer-readable medium of claim 11, wherein the 3D virtual environment includes a third avatar representing a third user, wherein the third user views the 3D virtual environment from a perspective of a third virtual camera at a location of the third avatar and the 3D virtual environment includes the first and second avatars at the respective first and second locations, and the operations further comprise:
  initiating a transition to a temporary configuration enabling interaction between the first user, the second user, and the third user, comprising:
    selecting a third location around the point;
    resituating the third avatar to the third location, wherein the third avatar is oriented to face the point;
    sending a second message instructing a third device of the third user to resituate the third virtual camera to the third location and to orient the third virtual camera to face the point; and
    when the temporary configuration is disabled, returning the third avatar and the third virtual camera to respective original positions.

13. The non-transitory computer-readable medium of claim 12, wherein the first virtual camera, second avatar, and third avatar exist in the 3D virtual environment in an ordering, wherein the ordering is maintained when repositioning the first virtual camera and resituating the second and third avatars.

14. The non-transitory computer-readable medium of claim 11, wherein steps (b)-(e) occur upon activation by the first user.

15. The non-transitory computer-readable medium of claim 11, wherein the second user is prompted to provide consent prior to resituating the second avatar and the second virtual camera to the second location.

16. The non-transitory computer-readable medium of claim 11, further comprising:
  determining an area of space surrounding the point such that the area of space appears as a natural spacing to users as if in a real-world environment,
  wherein the selecting comprises selecting the first and second location from within the area of space.

17. The non-transitory computer-readable medium of claim 16, wherein the selecting further comprises spacing the first and second locations substantially equidistant within the area of space.

18. The non-transitory computer-readable medium of claim 11, wherein the first and second locations are based on a size of an object, a size of the first avatar, a size of the second avatar, a distance between an object and the first and second avatars, a size of a user's web browser, or a size of the 3D virtual environment.

19. The non-transitory computer-readable medium of claim 11, wherein the first and second avatars each comprise a model having texture mapped video captured of the respective first and second users.

20. A system for resituating virtual cameras and avatars in a three-dimensional (3D) virtual environment, comprising:
  a first user device;
  a second user device; and
  a computing device, comprising:
    a processor; and
    a memory, wherein the memory contains instructions stored thereon that when executed by the processor cause the computing device to:
      render, on the first user device of a first user and from a perspective of a first virtual camera controlled by the first user, the 3D virtual environment, including a first avatar and a second avatar, wherein the first avatar represents the first user at a location of the first virtual camera and the second avatar represents a second user, wherein the second user views the 3D virtual environment from a perspective of a second virtual camera at a location of the second avatar;
      initiate a transition to a temporary configuration enabling interaction between the first user and the second user, comprising:
      selecting a first and second location around a point in the 3D virtual environment;
      repositioning the first virtual camera and the first avatar to the first location, wherein the first virtual camera and the first avatar are oriented to face the point as a result of the repositioning;
      resituating the second avatar to the second location, wherein the second avatar is oriented to face the point as a result of the resituating;
      sending a message instructing the second user device of the second user to resituate the second virtual camera to the second location and to orient the second virtual camera to face the point; and
      when the temporary configuration is disabled, returning the first virtual camera, the first avatar, the second avatar, and the second virtual camera to respective original positions.

* * * * *